US007601374B2

(12) United States Patent
Clarke

(10) Patent No.: US 7,601,374 B2
(45) Date of Patent: Oct. 13, 2009

(54) PACKAGING OF RESPIRING BIOLOGICAL MATERIALS

(75) Inventor: Raymond Clarke, Los Altos, CA (US)

(73) Assignee: Landec Corporation, Menlo Park, CA (US)

( * ) Notice: Subject to any disclaimer, the term of this patent is extended or adjusted under 35 U.S.C. 154(b) by 1353 days.

(21) Appl. No.: 09/989,682

(22) Filed: Nov. 20, 2001

(65) Prior Publication Data
US 2002/0127305 A1 Sep. 12, 2002

Related U.S. Application Data

(63) Continuation-in-part of application No. 09/858,190, filed on May 15, 2001.

(60) Provisional application No. 60/325,762, filed on May 26, 2002.

(51) Int. Cl.
A23B 7/148 (2006.01)
B65D 81/20 (2006.01)

(52) U.S. Cl. .................. 426/124; 426/106; 426/415; 426/419

(58) Field of Classification Search .............. 426/419, 426/415, 316, 270, 124, 106
See application file for complete search history.

(56) References Cited

U.S. PATENT DOCUMENTS

| 2,278,571 | A |   | 4/1942  | Skinner .................. 99/148 |
| 2,611,709 | A |   | 9/1952  | Plagge et al.    |
| 3,102,777 | A |   | 9/1963  | Bedrosian et al. |
| 3,360,380 | A |   | 12/1967 | Bedrosian        |
| 3,423,212 | A |   | 1/1969  | Purcell et al.   |
| 3,450,542 | A | * | 6/1969  | Badran           |
| 3,450,543 | A |   | 6/1969  | Badran et al.    |
| 3,450,544 | A | * | 6/1969  | Badran et al.    |
| 3,459,116 | A |   | 8/1969  | McDonnell        |
| 3,507,667 | A |   | 4/1970  | Magnen           |
| 3,574,642 | A |   | 4/1971  | Weinke           |
| 3,620,765 | A |   | 11/1971 | McDonnell et al. |
| 3,625,876 | A |   | 12/1971 | Fitko            |
| 3,630,759 | A |   | 12/1971 | Rumberger        |
| 3,681,092 | A |   | 8/1972  | Titchenal et al. .............. 99/174 |
| 3,683,788 | A |   | 8/1972  | McDonnell et al. |
| 3,706,410 | A |   | 12/1972 | Baker            |
| 3,795,749 | A |   | 3/1974  | Cummin et al.    |
| 3,798,333 | A | * | 3/1974  | Cummin et al.    |
| 3,804,961 | A |   | 4/1974  | Cummin et al.    |
| 3,844,865 | A |   | 10/1974 | Elton et al.     |
| 3,903,234 | A |   | 9/1975  | Ikeda et al.     |
| 3,932,692 | A |   | 1/1976  | Hirata et al.    |
| 3,951,610 | A |   | 4/1976  | Freebairn et al. |
| 3,975,455 | A |   | 8/1976  | Falender et al.  |
| 4,049,837 | A |   | 9/1977  | Freebairn        |
| 4,055,672 | A |   | 10/1977 | Hirsch et al.    |
| 4,153,659 | A |   | 5/1979  | Recktenwald      |
| 4,176,148 | A |   | 11/1979 | Magder et al.    |
| 4,209,538 | A |   | 6/1980  | Woodruff         |
| 4,219,965 | A |   | 9/1980  | Freebairn et al. |
| 4,224,347 | A |   | 9/1980  | Woodruff         |
| 4,256,770 | A |   | 3/1981  | Rainey           |
| 4,322,465 | A |   | 3/1982  | Webster          |
| 4,347,844 | A |   | 9/1982  | Ohki et al.      |
| 4,350,655 | A |   | 9/1982  | Hoge             |
| 4,386,129 | A |   | 5/1983  | Jacoby           |
| 4,394,930 | A |   | 7/1983  | Korpman          |
| 4,400,291 | A |   | 8/1983  | Freebairn et al. |
| 4,423,080 | A |   | 12/1983 | Bedrosian et al. |
| 4,461,420 | A |   | 7/1984  | Horvath          |
| 4,472,328 | A |   | 9/1984  | Sugimoto et al.  |
| 4,485,133 | A |   | 11/1984 | Ohtsuka et al.   |
| 4,487,791 | A |   | 12/1984 | Komatsu et al.   |
| 4,513,015 | A |   | 4/1985  | Clough           |
| 4,515,266 | A |   | 5/1985  | Myers            |
| 4,528,235 | A |   | 7/1985  | Sacks et al.     |
| 4,536,409 | A |   | 8/1985  | Farrell et al.   |
| 4,576,014 | A |   | 3/1986  | Miller et al.    |
| 4,613,544 | A |   | 9/1986  | Burleigh         |
| 4,657,610 | A |   | 4/1987  | Komatsu et al.   |

(Continued)

FOREIGN PATENT DOCUMENTS

EP 0311423 12/1989

(Continued)

OTHER PUBLICATIONS

Modern Packaging, 40, 2, 1966, Veerdjv et al, Controlling Atmosphere in a Fresh-Fruit Package.*
International Conference on Controlled Atmosphere Packaging CAP '84 Oct. 28, 1984, Brody, Schotland Business Research pp. 135, 137-150.*
Revue Generale Du Froid, No. 3, Mar. 1974, Marcellin, pp. 217-236.*
CSIRO Food Res. Q, 44, 2, 25-33, 1984, Irving.*
Product Marketing Almanac, 1987, 23,25,27,29 Varriano-Marston et al.*
Food Technology, Sep. 1988, p. 70,71,72,73,74,76. Zagory et al.*
Clarke et al., "Temperature Switchable Membranes for Creating and Maintaining Beneficial Package Atmospheres for Fresh Produce", Plastic Film and Sheeting, 17, pp. 22-34 (Jan. 2001).

(Continued)

Primary Examiner—Steve Weinstein
(74) Attorney, Agent, or Firm—Sheldon Mak Rose & Anderson PC

(57) ABSTRACT

Packaging of respiring biological materials, particularly bananas and other fruits, in sealed containers. The containers preferably include a gas-permeable membrane comprising (1) a microporous film, and (2) a polymeric coating on the microporous film. Using appropriate containers and appropriate controlled atmospheres around the container, the respiring materials can be stored and/or ripened under controlled conditions. Bananas can be ripened while they are being transported, or in conventional ripening rooms without opening the containers in which they have been transported. The ripe bananas are less dehydrated and remain in a satisfactory ripened state for longer periods of time.

11 Claims, No Drawings

U.S. PATENT DOCUMENTS

| | | | |
|---|---|---|---|
| 4,698,372 A | 10/1987 | Moss | |
| 4,704,238 A | 11/1987 | Okuyama et al. | |
| 4,705,812 A | 11/1987 | Ito et al. | |
| 4,705,813 A | 11/1987 | Ito et al. | |
| 4,734,324 A | 3/1988 | Hill | 428/317.3 |
| 4,759,444 A | 7/1988 | Barmore | |
| 4,759,935 A | 7/1988 | Toshitsugu | |
| 4,769,262 A | 9/1988 | Ferrar et al. | |
| 4,821,489 A | 4/1989 | MacLeod et al. | |
| 4,830,863 A | 5/1989 | Jones | 426/118 |
| 4,833,172 A | 5/1989 | Schwarz et al. | |
| 4,840,823 A | 6/1989 | Chigami et al. | |
| 4,842,875 A * | 6/1989 | Anderson | |
| 4,847,145 A | 7/1989 | Matsui | |
| 4,856,650 A | 8/1989 | Inoue | |
| 4,861,644 A | 8/1989 | Young et al. | |
| 4,863,788 A | 9/1989 | Bellairs et al. | |
| 4,876,146 A | 10/1989 | Isaka et al. | |
| 4,877,679 A | 10/1989 | Leatherman et al. | |
| 4,879,078 A | 11/1989 | Antoon | |
| 4,883,674 A | 11/1989 | Fan | |
| 4,885,086 A | 12/1989 | Miura | |
| 4,886,372 A | 12/1989 | Greengrass et al. | |
| 4,892,779 A | 1/1990 | Leatherman et al. | |
| 4,910,032 A | 3/1990 | Antoon, Jr. | 426/118 |
| 4,923,650 A | 5/1990 | Antoon et al. | |
| 4,923,703 A | 5/1990 | Antoon, Jr. | 426/118 |
| 4,937,115 A | 6/1990 | Leatherman | |
| 4,939,030 A | 7/1990 | Tsuji et al. | |
| 4,943,440 A | 7/1990 | Armstrong | |
| 4,956,209 A | 9/1990 | Isaka et al. | |
| 4,960,639 A | 10/1990 | Oda et al. | |
| 4,962,777 A | 10/1990 | Bell | |
| 4,973,625 A | 11/1990 | Deyrup | |
| 4,996,071 A | 2/1991 | Bell | |
| 5,006,342 A | 4/1991 | Cleary et al. | |
| 5,008,296 A | 4/1991 | Antoon et al. | |
| 5,011,698 A | 4/1991 | Antoon et al. | |
| 5,026,591 A | 6/1991 | Henn et al. | |
| 5,032,450 A | 7/1991 | Rechlicz et al. | |
| 5,035,933 A | 7/1991 | Ilenda et al. | |
| 5,039,565 A | 8/1991 | Deyrup | |
| 5,045,331 A * | 9/1991 | Antoon | |
| 5,066,683 A | 11/1991 | Dillon et al. | |
| 5,110,677 A | 5/1992 | Barmore et al. | |
| 5,126,197 A | 6/1992 | Schinkel et al. | |
| 5,153,039 A | 10/1992 | Porter et al. | |
| 5,160,768 A | 11/1992 | Antoon, Jr. | 428/35.2 |
| 5,164,258 A | 11/1992 | Shida et al. | |
| 5,165,947 A | 11/1992 | Colucci et al. | |
| 5,176,953 A | 1/1993 | Jacoby et al. | |
| 5,196,262 A | 3/1993 | Schwarz et al. | |
| 5,221,571 A | 6/1993 | Cammiss et al. | |
| 5,254,074 A | 10/1993 | Landers et al. | |
| 5,254,354 A | 10/1993 | Stewart | 426/106 |
| 5,254,401 A | 10/1993 | Kelch et al. | |
| 5,256,473 A | 10/1993 | Kotani et al. | |
| 5,260,360 A | 11/1993 | Mrozinski et al. | |
| 5,271,976 A | 12/1993 | Kondo et al. | |
| 5,275,854 A | 1/1994 | Maier et al. | |
| 5,279,843 A | 1/1994 | Zomorodi | |
| 5,300,570 A | 4/1994 | Ilenda et al. | |
| 5,316,778 A | 5/1994 | Hougham | |
| 5,317,035 A | 5/1994 | Jacoby et al. | |
| 5,322,726 A | 6/1994 | Dew | |
| 5,332,617 A | 7/1994 | Mills et al. | |
| 5,339,602 A | 8/1994 | Landers et al. | |
| 5,348,752 A | 9/1994 | Gorlich | |
| 5,352,513 A | 10/1994 | Mrozinski et al. | |
| 5,362,531 A | 11/1994 | Samuel et al. | |
| 5,411,351 A | 5/1995 | Lasch et al. | |
| 5,427,807 A | 6/1995 | Chum et al. | |
| 5,429,833 A | 7/1995 | Wyslotsky | |
| 5,443,851 A | 8/1995 | Christie et al. | |
| 5,458,899 A | 10/1995 | Floyd et al. | |
| 5,460,841 A | 10/1995 | Herdeman | |
| 5,516,539 A | 5/1996 | Walsh et al. | |
| 5,532,053 A | 7/1996 | Mueller | |
| 5,560,947 A | 10/1996 | Bell | |
| 5,565,230 A | 10/1996 | Bailey | |
| 5,575,418 A | 11/1996 | Wu et al. | |
| 5,658,607 A * | 8/1997 | Herdeman | |
| 5,667,827 A | 9/1997 | Breen et al. | 426/129 |
| 5,688,509 A | 11/1997 | Radwan et al. | |
| 5,711,978 A | 1/1998 | Breen et al. | 426/129 |
| 5,730,311 A | 3/1998 | Curtis | |
| 5,747,082 A | 5/1998 | Floyd et al. | |
| 5,759,650 A | 6/1998 | Raines et al. | |
| 5,799,495 A | 9/1998 | Gast et al. | 62/78 |
| 5,811,142 A | 9/1998 | DelDuca et al. | 426/424 |
| 5,820,955 A | 10/1998 | Brander | |
| 5,832,699 A | 11/1998 | Zobel | |
| 5,840,235 A | 11/1998 | Yagi et al. | |
| 5,849,127 A | 12/1998 | Kuo | |
| 5,865,335 A | 2/1999 | Farrell et al. | |
| 5,866,172 A | 2/1999 | Parks | |
| 5,866,184 A | 2/1999 | Gorlich et al. | |
| 5,866,649 A | 2/1999 | Hong et al. | |
| 5,908,649 A | 6/1999 | Floyd et al. | |
| 5,916,614 A | 6/1999 | Gorlich | |
| 5,932,497 A | 8/1999 | Morman et al. | |
| 5,935,681 A | 8/1999 | Paulett | |
| 5,954,067 A | 9/1999 | Brown et al. | |
| 5,958,319 A | 9/1999 | Brant | |
| 6,013,293 A * | 1/2000 | De Moor | |
| 6,050,412 A | 4/2000 | Clough et al. | |
| 6,060,136 A | 5/2000 | Patrick et al. | |
| 6,063,505 A | 5/2000 | Kuratsuji et al. | |
| 6,085,930 A | 7/2000 | Curtis | |
| 6,152,295 A | 11/2000 | Brander et al. | |
| 6,189,299 B1 | 2/2001 | Brown et al. | |
| 6,210,724 B1 | 4/2001 | Clarke et al. | |
| 6,248,380 B1 | 6/2001 | Kocher et al. | |

FOREIGN PATENT DOCUMENTS

| | | | |
|---|---|---|---|
| EP | 351115 | | 1/1990 |
| EP | 351116 | | 1/1990 |
| EP | 752378 | * | 1/1997 |
| JP | 57-94244 | * | 6/1982 |
| WO | WO 94/12040 | | 6/1994 |
| WO | WO 95/00030 | | 1/1995 |
| WO | WO 96/38495 | | 12/1996 |
| WO | WO 00/04787 | | 2/2000 |

OTHER PUBLICATIONS

Clarke, "Temperature Switchable Membranes for Packaging Fresh Produce", 2000 TAPPI Polymers, Laminations & Coatings Conference, Nov. 2000, pp. 1257-1271.

Clarke, "Temperature Switchable Membranes for Packaging Fresh Produce", Paper, Film & Foil Converter, Nov. 1, 2000.

Clarke, "Temperature Switchable Membranes for Creating and Maintaining Beneficial Package Atmospheres for Fresh Produce", 1999 Polymers, Laminations & Coatings Conference, pp. 663-669, Aug. 1999.

Clarke et al, "The Future in Film Technology: a Tunable Packaging System for Fresh Produce", 7th Int. Controlled Atm.Res. Conf CA97 Proc. 5, 68-75 (Oct. 1997).

Mannapperuma et al, "Design of Polymeric Packages for Modified Atmosphere Storage of Fresh Produce", Proc. 5th Int'l Res. Conf, vol. 2, pp. 225-233, Jun. 1989.

Liu,, "The Ethylene Problem in Apple Storage", Michigan State University, Hort. Rep 28, pp. 86-96 (1977).

Kader, "Relative Tolerance of Fruits and Vegetables to Elevated $CO_2$ and reduced $O_2$ Levels", Michigan State University, Hort. Rep 28, pp. 260-264 (1977).

Marriott, "Bananas—Physiology and Biochemistry of Storage and Ripening for Optimum Quality", CRC Critical Reviews in Food Science & Nutrition, pp. 41-54 (1980).

Liu, "Storage of Bananas in Polyethylene Bags with an Ethylene Absorbent", HortScience, 5 (1), pp. 25-27 (Feb. 1970).

Revue Generale du Froid, #3, Mar. 1974, Marcellin, pp. 217-236.

Yahia, E. 1997. Modified/controlled atmospheres for bananas and plantains (*Musa* spp). p. 104-109 in: A.A.Kader (editor).CA'97 Proceedings vol. 3: Fruits other than apples and pears. Postharvest Horticulture Series No. 17, University of California, Davis.

Biale, J.B. Respiration of Fruits Encyclopedia of Plant Physiology (1960) Berlin: Springer-Verlag; Ed. W. Ruhland, vol. XII, Pt. 2, pp. 536 and 566-571.

Brady, C.J.; O'Connell, P.B.H.; Smydzuk, J.; Wade, N.L. Permeability, Sugar Accumulation, and Respiration Rate in Ripening Banana Fruits Aust. J. Biol. Sci., (1970) 23, pp. 1143-1152.

Broughton, W.J.; Wu, K.F. Storage Conditions and Ripening of Two Cultivars of Banana Scientia Hort. (Amsterdam) (1979) vol. 10, Issue 1: pp. 83-93.

Brown, D.J. The Effects of Low Oxygen Atmospheres on Ethylene and Carbon Dioxide Production by and 1-Amino-cyclopropane-1-Carboxylic Acid Concentration in Banana Fruits MS Thesis (1981), University of Maryland, College Park.

Elyatem, S.M.; Banks N. H.; Cameron, A.C. Oxygen Concentration Effects on Ethylene Production by Ripening Banana Tissue Postharvest Biology and Techonology 4 (1994), pp. 343-351.

Fuchs, Y.; Gorodeiski, N.T. The Course of Ripening of Banana Fruits Stored in Sealed Polyethylene Bags J. Amer. Soc. Hort. Sci., (1971) 96(4): pp. 401-403.

Gowen, S. Bananas and Plantains Chapman & Hall (1995) pp. 424-425.

Hesselman, C.W.; Freebairn, H.T. Rate of Ripening of Initiated Bananas as Influenced by Oxygen and Ethylene J. Amer. Soc. Hort. Sci., (1969) 94(6): pp. 635-637.

Hewage, S.K.; Wainwright, H.; Wijerathnam S.W.; Swinburne, T. The Modified Atmosphere Storage of Bananas as Affected by Different Temperatures Postharvest Phys., Pathology and Technol. for Hort. Commodities: Recent Advances (1995) pp. 172-176.

Kanellis, A.; Solomos, T. The Effect of Low Oxygen on the Activities of Pectinmethylesterase and Acid Phosphatase During the Course of Ripening of Bananas 4$^{th}$ Natl. Controlled Atmosph. Res. Conf.; Raleigh, NC (1985) SM Blankenship: pp. 20-26.

Leonard, E.R. Studies in Tropical Fruits. XVII. The Respiration of Bananas in Different Concentrations of Oxygen at 53F, and During Subsequent Ripening in Air at 68F. Annals of Botany (Jul. 1947) N.S. vol. XI, No. 43: pp. 299-331.

Liu, F.W. Storing Ethylene-Pretreated Bananas in Controlled Atmosphere and Hypobaric Air J. Amer. Soc. Hort. Sci. (1976) 101(3):pp. 198-201.

Liu, F.W. Banana Response to Low Concentrations of Ethylene J. Amer. Soc. Hort. Sci., (1976) 101(3) pp. 222-224.

Liu, F.W. Ethylene Inhibition of Senescent Spots on Ripe Bananas J. Amer. Soc. Hort. Sci. (1976) vol. 101(6): pp. 684-686.

Liu, F.W. Ripening Bananas with Ethephon in Three Polymeric Film Packages HortScience, (1978) 13(6) pp. 688-690.

Liu, F.W. Synergistic Effects of High Temperature and Low Concentration Ethylene on Ripening of "Dwarf Cavendish" Bananas HortScience (1978) 13(6): pp. 690-692.

Lowings, P.H.; Cutts, D.F. The Preservation of Fresh Fruits and Vegetables Proceedings—Inst. Food Science & Tech. of the UK (Jun. 1982) vol. 15(2): pp. 52-54.

Mapson, L.W. Biosynthesis of Ethylene and Its Control IN: Conf Trop Subtrop Fruits; Food Research Institute, Norwich, England: (1969), pp. 85-92.

Mapson, L.W. Biosynthesis of Ethylene and the Ripening of Fruit Endeavour (1970) vol. 29(106): pp. 29-33.

Mapson, L.W.; Robinson, J.E. Relation Between Oxygen, Tension, Biosynthesis of Ethylene, Respiration and Ripening Changes in Banana Fruit J. Food Technol. (1966) vol. 1, pp. 215-225.

Marriott, J. Bananas—Physiology and Biochemistry of Storage and Ripening for Optimum Quality CRC Critical Reviews in Food Science and Nutrition (1980) 13(1): pp. 41-42.

McGlasson, W.B.; Wills, R.B.H. Effects of Oxygen and Carbon Dioxide on Respiration, Storage Life, and Organic Acids of Green Bananas Aust. J. Biol. Sci. (1972) 25(1): pp. 35-42.

Parsons, CS.; Gates, J.E.; Spalding, D.H. Quality of Some Fruits and Vegetables after Holding in Nitrogen Atmospheres Amer. Soc. For Hort. Sci. (1964) vol. 84: pp. 549-566.

Peacock, B.C. Banana Ripening-Effect of Temperature on Fruit Quality Queensland Journal of Agricultural and Animal Sciences (1980) vol. 37(1): pp. 39-45.

Quazi, M.H.; Freebairn, H.T. The Influence of Ethylene, Oxygen, and Carbon Dioxide on the Ripening of Bananas Botanical Gazette, (1970) 131(1):pp. 5-14.

Rippon, L.E.; Trochoulias, T. Ripening Responses of Bananas to Temperature Aust. J. of Exper. Ag. and Animal Husbandry (1976) vol. 16, Part 78: pp. 140-144.

Scott, K.J.; McGlasson, W.B.; Roberts, E.A. Potassium Permanganate as an Ethylene Absorbent in Polyethylene Bags to Delay Ripening of Bananas During Storage Aust. J. Exper. Ag. and Animal Husbandry (1970) vol. 10: pp. 237-240.

Scriven, F.M.; Gek, C.O.; Wills, B.H. Sensory Differences between Bananas Ripened Without and With Ethylene HortScience (1989) 24(6): pp. 983-984.

Smock, R.M. Controlled Atmosphere Storage of Fruits Horticultural Reviews, 1979, vol. 1, pp. 301-336.

Smock, R.M. Methods of Storing Bananas Philippine Agriculturist (1967) vol. 51: pp. 501-517.

Wade, N.L. Effects of Oxygen Concentration and Ethepon Upon the Respiration and Ripening of Banana Fruits J. of Experimental Botany, (1974) vol. 25(88): pp. 955-964.

Wardlaw, C.W. Preliminary Observations on the Refrigerated Gas Storage of Gros Michel Bananas Tropical Agriculture (Trinidad), (1940) vol. XVII, No. 6: pp. 103-105.

Woodruff, R.E. Modified Atmosphere Storage of Bananas Proc. Natl. CA Res. Conf., Michigan State Univ. (1969b) Hort Rpt. 9:pp. 80-94.

Young, R.E.; Romani, R.J.; Biale, J.B. Carbon Dioxide Effects on Fruit Respiration. II. Response of Avocados, Bananas, & Lemons Plant Physiol., (1962) vol. 37: pp. 416-422.

* cited by examiner

PACKAGING OF RESPIRING BIOLOGICAL MATERIALS

CROSS-REFERENCE TO RELATED APPLICATIONS

This application is a continuation-in-part of my copending, commonly assigned application Ser. No. 09/858,190, filed May 15, 2001, which claims priority under 37 CFR 1.78 (a)(5) from provisional Application Ser. No. 60/325,762 filed May 26, 2002. Application Ser. No. 60/325,762 has an effective filing date of May 26, 2000, and resulted from the conversion to a provisional application of application Ser. No. 09/580,379, filed May 26, 2000. This application is also related to International Application No. PCT/US 01/40732, filed May 15, 2001. The disclosure of each of the above-identified applications is incorporated herein by reference.

BACKGROUND OF THE INVENTION

This invention relates to the packaging of respiring biological materials.

Respiring biological materials, e.g. fruits and vegetables, consume oxygen ($O_2$) and produce carbon dioxide ($CO_2$) at rates which depend upon the stage of their development, the atmosphere surrounding them and the temperature. In modified atmosphere packaging (MAP), the objective is to produce a desired atmosphere around respiring materials by placing them in a sealed container whose permeability to $O_2$ and $CO_2$ is correlated with (i) the partial pressures of $O_2$ and $CO_2$ in the air outside the package, and (ii) the temperature, to produce a desired atmosphere within the container. In many cases, the container includes an atmosphere control member having a high permeability to $O_2$ and $CO_2$. In controlled atmosphere packaging (CAP), the objective is to produce a desired atmosphere around respiring materials by displacing some or all of the air within a container by one or more gases, e.g. nitrogen, $O_2$, $CO_2$ and ethylene, in desired proportions. Reference may be made, for example, to U.S. Pat. No. 3,360,380 (Bedrosian), U.S. Pat. No. 3,450,542 (Badran), U.S. Pat. No. 3,450,544 (Badran et al.), U.S. Pat. No. 3,798,333 (Cummin et al), U.S. Pat. No. 3,924,010 (Erb), U.S. Pat. No. 4,003,728 (Rath), U.S. Pat. No. 4,734,324 (Hill), U.S. Pat. No. 4,779,524 (Wade), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 4,987,745 (Harris), U.S. Pat. No. 5,041,290 (Wallace et al.) U.S. Pat. No. 5,045,331 (Antoon), U.S. Pat. No. 5,063,753 (Woodruff), U.S. Pat. No. 5,160,768 (Antoon), U.S. Pat. No. 5,254,354 (Stewart), U.S. Pat. No. 5,333,394 (Herdeman), U.S. Pat. No. 5,433,335 (Raudalus et al.), U.S. Pat. No. 5,460,841 (Herdeman), U.S. Pat. No. 5,556,658 (Raudalus et al.), U.S. Pat. No. 5,658,607 (Herdeman) and U.S. Pat. No. 6,013,293 (De Moor), copending commonly assigned U.S. patent application Ser. No. 08/759,602 (Clarke et al.) and Ser. No. 09/121,082 (Clarke et al.), International Publication Nos. WO 94/12040 (Fresh Western), WO 96/38495 (Landec) and WO 00/04787 (Landec), and European Patent Applications Nos. 0,351,115 and 0,351,116 (Courtaulds). The disclosure of each of these patents, applications and publications is incorporated herein by reference.

The preferred packaging atmosphere for a respiring material often depends on the age of the material and the changes (if any) in the material which are desired. For example, the preferred $O_2$ content during storage of unripe fruits is substantially lower than the preferred $O_2$ content during subsequent ripening at a higher temperature. This fact causes problems for both MAP and CAP. For example, in MAP, although the $O_2$ permeability of the container generally increases with temperature (especially if it contains an atmosphere control member comprising a crystalline polymer having an appropriate melting point, as disclosed in U.S. patent applications Ser. Nos. 08/759,602 and 09/121,082 and International Publication Nos. WO 96/38459 and WO 00/04787), the increase is often insufficient to avoid the need for significant compromise between the preferred atmospheres at different stages. In CAP, it is theoretically possible to monitor the packaging atmosphere and to change it as often as is necessary to maintain the preferred level of $O_2$ (and other gases). But this is difficult and expensive, and often impractical.

Many fruits are picked when they are unripe; transported and stored under conditions which prevent or retard ripening; and ripen shortly before sale. Many fruits ripen more rapidly when exposed to ethylene, and some (e.g. bananas, tomatoes, avocados, Bartlett pears, kiwis, melons, peppers and mangos) are ripened commercially by exposure to ethylene in ripening rooms. When the fruits have been placed in a sealed bag or other container for transport or storage, the container is opened to expose the fruits to the ethylene. Another problem associated with the use of ripening rooms is that the fruits can ripen too rapidly, especially when the fruits ripen through a climacteric and therefore undergo a very large increase in respiration rate and generate heat in the ripening room.

The transport, storage and ripening of bananas present particularly serious problems because (i) bananas are grown in locations far distant from the locations at which they are consumed;

(ii) they are damaged by storage at temperatures below about 14° C. (57-58° F.), with the extent of the damage depending upon the time spent below that temperature and how far the temperature is below 14° C.;

(iii) they ripen through a climacteric, and this results in a very large increase in respiration rate and the generation of heat;

(iv) they generate ethylene as they ripen, and they ripen at a rate which increases with the concentration of ethylene around them—as a result, a single prematurely ripe banana can trigger premature ripening of many others; and (iv) once they have ripened, and have been exposed to air, they rapidly become over-ripe.

These problems have not yet been solved. The conventional procedure is to harvest the bananas when they are hard, green and unripe; to transport the green bananas, at 14-18° C. to the location where they will be consumed; to ripen the green bananas by exposing them to ethylene in a ripening room at that location; and to place the ripened bananas on sale. The time at which the bananas are harvested depends on the days needed to transport them to the point-of-sale. Thus bananas are typically harvested at week 11 (i.e. 11 weeks after the flower emerges from the plant) or week 12. The green bananas are shipped in bags made of polyethylene about 0.04 to 0.06 mm (1.5-2.5 mil) thick, with each bag containing about 18 kg (40 lb) of bananas and being supported by a cardboard box. In some cases, after the bananas have been placed in the bag, most of the air is exhausted from the bag, and the bag is then sealed; this is the procedure generally described in U.S. Pat. No. 3,450,542 (Badran). In other cases, the bag contains vent holes.

This conventional procedure suffers from a number of problems, for example:

1. The need to harvest the bananas a good while before they are fully grown. It would be desirable to harvest the bananas at a later time, when they are larger. However, the later the bananas are picked, the more likely it is that their climacteric will be triggered by small concentrations of ethylene. Experience has shown that if bananas are harvested later than the presently established timetables, this results in prematurely ripe bananas when the bananas are shipped in vented bags, and in so-called "green-ripe" bananas when the bananas are shipped in sealed bags. Green-ripe bananas soften, but remain green, and have an unpleasant flavor.
2. In order to ripen green bananas in a ripening room, it is necessary to open each of the shipping bags if the bags have been sealed during shipping.
3. Bananas ripen very rapidly, which heats the bananas excessively and/or increases the demand on the refrigeration equipment used to cool the ripening room.
4. The bananas, once ripened, must be sold within a few days, or scrapped.

SUMMARY OF THE INVENTION

A first area of the present invention is based on my realization that for bananas and other fruits which ripen when exposed to ethylene, one or more of the problems noted above can be mitigated or overcome by ripening fruits within a sealed container which provides a pathway for $O_2$, $CO_2$ and ethylene to enter or leave the container. The fruits can be ripened by exposing them to ethylene which (i) enters the container from an ethylene-containing atmosphere adjacent to the sealed container and/or (ii) is generated within the sealed container.

A second area of the present invention is concerned with situations in which the preferred packaging atmosphere has a zero or relatively low content of a particular gas during one stage and a relatively high content of that gas during another stage, in particular a relatively low $O_2$ content during one stage and a relatively high $O_2$ content during another stage. I have realized that in such situations, valuable results can be obtained by combining the techniques of MAP and CAP. For example, a container having a high $O_2$ permeability can be placed either (i) in air when a packaging atmosphere of high $O_2$ content is desired, or (ii) in a controlled atmosphere having a selected reduced $O_2$ content when a packaging atmosphere of low $O_2$ content is desired.

Some aspects of the present invention make use of both the first and second areas of the invention.

As noted above, some fruits generate ethylene as they ripen. Such ethylene is referred to herein as endogenous ethylene. The term "exogenous ethylene" is used herein to mean ethylene which is not derived from the fruits which are being ripened. Some other materials, for example acetylene, will also assist ripening of fruits which are ripened by exposure to ethylene. Reference may made for example to Burg et al, Molecular Requirements for the Biological Activity of Ethylene, Plant Physiology (Lancaster) (1967) 42: 144-155. The term "ethylenic ripening agent" is used herein to mean ethylene or another substance which also assists ripening of fruits which are ripened by exposure to ethylene. The abbreviation ERA is used herein for the term "ethylenic ripening agent". The term "exogenous ERA" is used herein to mean ethylenic ripening agent which is not derived from the fruits which are being ripened.

The first area of the invention includes the following aspects.

I. A method of ripening fruits, the method comprising
 (A) providing a sealed package which comprises
  (a) a sealed container, and
  (b) within the sealed container, (i) unripe fruits which ripen when exposed to ERA and (ii) a packaging atmosphere around the unripe fruits; the sealed container providing a pathway for $O_2$, $CO_2$ and ERA to enter or leave the packaging atmosphere; and
 (B) exposing the exterior of the sealed package to an atmosphere which contains exogenous ERA.

II. A method of ripening fruits, the method comprising
 (A) providing a sealed package which comprises
  (a) a sealed container, and
  (b) within the sealed container, (i) unripe fruits which ripen when exposed to exogenous ERA, (ii) a packaging atmosphere around the unripe fruits and (iii) a source of exogenous ERA;
  the sealed container providing a pathway for $O_2$, $CO_2$ and ERA to enter or leave the packaging atmosphere; and
 (B) exposing the unripe fruits in the sealed package to exogenous ERA from the source of exogenous ERA in the sealed container.

III. A sealed package which comprises
 (a) a sealed container, and
 (b) within the sealed container, (i) fruits, for example fruits which have ripened through a climacteric, (ii) a packaging atmosphere around the fruits, and (iii) exogenous ERA and/or a residue of exogenous ERA, the exogenous ERA and/or residue of exogenous ERA optionally being a gas which is part of the packaging atmosphere;
 the sealed container providing a pathway for $O_2$, $CO_2$ and ERA to enter or leave the packaging atmosphere.

IV. A package which comprises
 (a) a container, the container being a sealed container or an open container obtained by opening a sealed container, and
 (b) within the container, (i) fruits, and (ii) a packaging atmosphere around the fruits; the container, if it is sealed, providing a pathway for $O_2$, $CO_2$ and ERA to enter or leave the packaging atmosphere, and if it is open, having provided a pathway for $O_2$, $CO_2$ and ERA to enter or leave the packaging atmosphere when it was sealed;
 the container having one or both of the following characteristics
  (i) the fruits therein have been ripened at least in part by exposure to exogenous ERA, and
  (ii) it contains the residue of a source of exogenous ERA.

For example, the container can be a sealed or open container in which the fruits have ripened through a climacteric as a result of exposure to ethylene in a ripening room, or as a result of exposure to exogenous ERA generated within the container while it was sealed.

V. A container, for example a shipping or trucking container, which may be a closed container or an open container, which contains a plurality of sealed packages, each of the packages comprising
 (a) a sealed container, and
 (b) within the sealed container, (i) fruits, for example fruits which have ripened through a climacteric, or unripe fruits which ripen through a climacteric, and (ii) a packaging atmosphere around the fruits;

the sealed container providing a pathway for $O_2$, $CO_2$ and ERA to enter or leave the packaging atmosphere;

the container containing the plurality of sealed packages having at least one of the following features
- (i) the packaging atmosphere in each of the sealed packages contains exogenous ERA and/or a residue of exogenous ERA;
- (ii) at least some, and preferably each, of the sealed packages contains and exogenous ERA and/or a residue of exogenous ERA, the exogenous ERA and/or residue of exogenous ERA optionally being a gas which is part of the packaging atmosphere, or
- (iii) the shipping or trucking or other container contains not only the sealed packages containing the fruits but also, not within any of the sealed packages, exogenous ERA and/or a residue of a source of exogenous ERA, the exogenous ERA and/or residue of a source of exogenous ERA optionally being a gas which is part of the atmosphere which contacts the exterior of the sealed packages.

The second area of the invention includes the following aspects.

VI. A method of storing and/or ripening a respiring biological material, the method comprising
- (A) providing a sealed package comprising
  - (a) a sealed container, and
  - (b) within the sealed container, the respiring biological material;
  the sealed container providing a pathway for $O_2$ and $CO_2$ to enter or leave the packaging atmosphere;
- (B) exposing the exterior of the sealed package to a first atmosphere containing $O_2$;
- (C) after step (B), exposing the exterior of the sealed package to a second atmosphere containing $O_2$;
the first and second atmospheres differing by at least 1% in their content of at least one gas which will pass through the container. Preferably there is a difference between the $O_2$ contents of the first and second atmospheres of at least 3%.

The $O_2$ contents of the packaging atmospheres in steps (B) and (C) will be lower than the $O_2$ contents of the atmospheres surrounding the package, and any difference between them will be less than any difference between the $O_2$ contents of the first and second atmospheres. Preferably, one of the first and second atmospheres is air.

This aspect of the invention is useful for the treatment of any respiring biological material, including but not limited to, fruits (e.g. fruits which have ripened through a climacteric, or unripe fruits which ripen through a climacteric) and vegetables.

In one embodiment of this aspect of the invention,
- (a) in step (B), the first atmosphere is a controlled atmosphere having a reduced $O_2$ content, for example (i) less than 18% $O_2$, preferably less than 12% $O_2$, particularly less than 9% $O_2$, but (ii) more than 2% $O_2$, preferably more than 4% $O_2$, particularly more than 5% $O_2$, and the permeability of the container is such that the $O_2$ content of the packaging atmosphere is high enough to maintain respiration of the biological material (for example, in the case of unripe fruits, an $O_2$ content which is high enough to maintain respiration of the fruits, but low enough that the unripe fruits ripen slowly or not at all), and
- (c) in step (C), the second atmosphere contains at least 3% more oxygen than the first atmosphere.

In this embodiment, when the package contains unripe fruits, the second atmosphere optionally contains exogenous ERA, and is preferably air or a mixture of air and exogenous ERA. This results in an increase in the $O_2$ content of the packaging atmosphere, thus assisting the unripe fruits to ripen.

In another embodiment of this aspect of the invention,
- (a) the sealed packages contain fruits which initially are unripe,
- (b) in step (B), the first atmosphere is air, and the permeability of the container is such that the $O_2$ content of the packaging atmosphere is high enough to maintain respiration of fruits, but low enough that the unripe fruits ripen slowly or not at all, and
- (c) in step (C), the second atmosphere contains at least 3% more oxygen than the first atmosphere, and preferably has an $O_2$ content of at least 24%, particularly at least 28% oxygen, thus increasing the $O_2$ content of the packaging atmosphere and assisting the unripe fruits to ripen.

In step (C), the fruits can if desired be exposed to exogenous ERA, for example by including exogenous ERA in the second atmosphere, and/or by including a source of exogenous ERA within the sealed package, and/or, when there are a plurality of packages in a large container, e.g. a shipping or trucking container, by including a source of ethylenic ripening agent within the large container, but outside the sealed packages. This embodiment of the invention can be used to transport and ripen bananas in a sealed container, for example a conventional polyethylene bag, whose oxygen permeability is too low to permit satisfactory ripening in the atmospheres used in conventional ripening rooms.

In these two embodiments, it is preferred that, during at least one period of step (B), the $O_2$ content of the packaging atmosphere reaches a value, which may be an equilibrium value, which is (i) more than 1%, preferably more than 2%, and (ii) less than 7%, preferably less than 5%, particularly less than 3.5%.

In another embodiment of this aspect of the invention, the first and second atmospheres differ in their content of some gas other than oxygen which will pass through the sealed container, for example $CO_2$ or another gas having a desired effect on the respiring biological material, e.g. an insecticide, a fungicide or a mold-inhibiting compound. One of the atmospheres can contains 0% of the gas other than oxygen. In this embodiment, the $O_2$ content of the first and second atmospheres can be the same or different. For example, this embodiment of the invention code be used to store the respiring material in the sealed package under preferred conditions during one of steps (B) and (C), and in the other step to use a controlled atmosphere to change the packaging atmosphere, for a relatively short time, to an atmosphere containing a desired amount of the gas other than oxygen, for example to contact the respiring material with an atmosphere containing a relatively high percentage of $CO_2$, e.g. 15-30%, for a relatively limited period of time, e.g. for 5-48 or 15-30 hours. Such a method would be useful, for example, for the treatment of broccoli to control aphids.

The invention is particularly useful for the storage and/or ripening of bananas. Some embodiments of the invention make it possible to maintain bananas, before and/or after their climacteric, in a packaging atmosphere which enables storage and/or ripening of green bananas in a controlled fashion. Other embodiments of the invention make it possible to ripen bananas in a sealed container, for example in a conventional ripening room or in a closed container in which the bananas are being transported; and/or to harvest bananas at a later time than is now possible; and/or to store bananas, after their climacteric, within a desired range of color stages (e.g. within the range most attractive for retail sale) for a longer period than is possible under conventional practice.

Some embodiments of the invention which are particularly suitable for the ripening and/or storage of bananas have been described above. Other aspects of the invention which are particularly suitable for the ripening and/or storage of bananas include the following.

VII. A container which is suitable for packaging bananas and which can be sealed around a quantity of bananas, said quantity being at least 4 kg, preferably at least 15 kg, especially 16 to 22 kg, and which, when sealed around the bananas, has an $O_2$ permeability at 13° C. per kg of bananas in the container (abbreviated herein to OP13/kg) of at least 700, preferably at least 1000, particularly at least 1500, ml/atm.24 hrs. In some embodiments, the container has an R ratio at 13° C. of at least 1.3, particularly at least 2, especially at least 3. In some embodiments, the container has an ethylene permeability at 13° C. per kg of bananas in the container (abbreviated herein to EtP/13 kg) which is at least 2 times, preferably at least 3 times, particularly at least 4 times, the OP13/kg of the container.

It is to be understood that this aspect of the invention includes containers which are as defined above but which are used for the packaging of fruits other than bananas. It is also to be understood that the containers defined above can be used to ripen fruits by exposing them to any exogenous ERA. When ripening fruits by exposing them to an exogenous ERA other than ethylene, the containers preferably have a permeability at 13° C. to that ERA per kg of bananas which is at least two times, preferably at least 3 times, particularly at least 4 times, the OP13/kg of the container.

VII. A package which comprises
  (a) a sealed container, and
  (b) within the sealed container, bananas and a packaging atmosphere around the bananas;

the sealed container having an OP13/kg of at least 700, preferably at least 1000, particularly at least 1500, ml/atm.24 hrs. In some embodiments, the sealed container has an R ratio at 13° C. of 1.3, particularly at least 2, especially at least 3.

IX. A method of ripening green bananas which comprises
  (A) providing a sealed package which comprises
    (a) a sealed container, and
    (b) within the sealed container, green bananas and a packaging atmosphere around the green bananas;
    the sealed container having an OP13/kg of at least 700, preferably at least 1000, particularly at least 1500, ml/atm.24 hrs, and preferably having an R ratio at 13° C. of at least 1.3, particularly at least 2, especially at least 3, and preferably having an EtP/13 kg which is at least 3 times, preferably at least 4 times, the OP13/kg of the container; and
  (B) exposing the exterior of the sealed package to an atmosphere containing exogenous ERA.

X. A method of ripening green bananas which comprises
  (A) placing, in a sealable container,
    (a) the green bananas, and
    (b) a source of exogenous ERA;
  (B) sealing the container around the green bananas and the source of exogenous ERA, thus providing a sealed package which comprises
    (a) a sealed container, and
    (b) within the sealed container, the green bananas, the source of exogenous ERA, and a packaging atmosphere around the green bananas;
    the sealed container having an OP13/kg of at least 700, preferably at least 1000, particularly at least 1500, ml/atm.24 hrs, and preferably having an R ratio at 13° C. of at least 1.3, particularly at least 2, especially at least 3, and preferably having an EtP/13 kg which is at least 3 times, preferably at least 4 times, the OP13/kg of the container; and
  (C) exposing the bananas in the sealed package to exogenous ERA from the source of exogenous ERA in the sealed container.

XI. A method of storing green bananas which comprises
  (A) placing the green bananas in a container which comprises an atmosphere control member which preferably comprises
    (1) a microporous film, and
    (2) a polymeric coating, preferably a crystalline polymeric coating, on the microporous film;
  (B) sealing the container, thus providing a sealed package which comprises
    (a) a sealed container, and
    (a) within the sealed container, the green bananas, and a packaging atmosphere around the green bananas; and
  (C) maintaining the sealed bag at the temperature of 13-18° C.

XII. A package which is stored in air and which comprises
  (a) a sealed container, and
  (b) within the sealed container, 1 to 6 kg, e.g. 1 to 2.5 kg (2 to 15 lb, e.g. 2 to 5 lb) of bananas which have passed their climacteric and which are at a color stage less than 5, and a packaging atmosphere around the bananas;
  the sealed container providing a pathway for $O_2$ and $CO_2$ to enter or leave the packaging atmosphere;
  the packaging atmosphere preferably containing at least 0.8%, preferably 1.5 to 6%, especially 1.5 to 3%, of $O_2$, and less than 15%, preferably less than 7%, of $CO_2$, and the total quantity of $O_2$ and $CO_2$ preferably being less than 16%, particularly less than 10%.

XIII. A package which comprises
  (a) a sealed container, and
  (b) within the sealed container, bananas and a packaging atmosphere around the bananas;

the sealed container including at least one permeable control member which provides a pathway for $O_2$, $CO_2$ and ERA to enter or leave the packaging atmosphere and which comprises a gas-permeable membrane comprising
  (a) a microporous polymeric film, and
  (b) a crystalline polymeric coating on the microporous film.

XIV. A method of ripening green bananas which comprises
  (A) providing a sealed package which comprises
    (a) a sealed container, and
    (b) within the sealed container, green bananas and a packaging atmosphere around the green bananas;
    the sealed container including at least one permeable control member which provides a pathway for $O_2$, $CO_2$ and ERA to enter or leave the packaging atmosphere; and
  (B) exposing the exterior of the sealed package to an atmosphere containing exogenous ERA.

XV. A method of ripening green bananas which comprises
  (A) placing, in a sealable container,
    (a) the green bananas, and
    (b) a source of exogenous ERA;
  (B) sealing the container around the green bananas and the source of exogenous ERA, thus providing a sealed package which comprises (a) a sealed container, and
(b) within the sealed container, the green bananas, the source of exogenous ERA, and a packaging atmosphere around the green bananas;
the sealed container providing a pathway for $O_2$, $CO_2$ and ERA to enter or leave the packaging atmosphere; and
(C) exposing the bananas in the sealed package to exogenous ERA from the source of exogenous ERA in the sealed container.

XVI. A method of storing green bananas which comprises
(A) placing the green bananas in a sealable container;
(B) sealing the container, thus providing a sealed package which comprises
(a) a sealed container, and
(b) within the sealed container, the green bananas, and a packaging atmosphere around the green bananas;
the sealed container providing a pathway for $O_2$ and $CO_2$ to enter or leave the packaging atmosphere and
(C) maintaining the sealed bag at the temperature of 13-18° C.

XVII. A method of storing green bananas, the method comprising
(A) providing a sealed package comprising (a) a sealed container, and (b) within the sealed container, the green bananas and a packaging atmosphere around the green bananas; the sealed container providing a pathway for $O_2$ and $CO_2$ to enter or leave the packaging atmosphere; and
(B) storing the sealed package in a controlled atmosphere which contains (i) less than 18% $O_2$, preferably less than 12% $O_2$, particularly less than 9% $O_2$, and (ii) more than 2% $O_2$, preferably more than 4% $O_2$, particularly more than 5% $O_2$, the sealed package having an $O_2$ permeability such that, during at least one period of step (B), the $O_2$ content of the packaging atmosphere reaches a value, which may be an equilibrium value, which is (i) more than 1%, preferably more than 2%, and (ii) less than 7%, preferably less than 5%, particularly less than 3.5%.

It is possible for the bananas to ripen under the storage conditions without the use of exogenous ERA. However, the method preferably further comprises
(C) during or after step (B), exposing the fruits to exogenous ERA, preferably by exposing the exterior of the sealed package to a second controlled atmosphere which contains exogenous ERA, especially a mixture of air and exogenous ethylene, thereby ripening the bananas.

XVIII. A method of storing and ripening green bananas, the method comprising
(A) providing a sealed package comprising (a) a sealed container, and (b) within the sealed container, the green bananas, a packaging atmosphere around the green bananas, and a latent source of exogenous ERA;
the sealed container providing a pathway for $O_2$ and $CO_2$ to enter or leave the packaging atmosphere; and
(B) storing the sealed package (a) under conditions such that ERA is not released from the latent source and (b) in a controlled atmosphere which contains (i) less than 18% $O_2$, preferably less than 12% $O_2$, particularly less than 9% $O_2$, and (ii) more than 2% $O_2$, preferably more than 4% $O_2$, particularly more than 5% $O_2$, the sealed package having an $O_2$ permeability such that, during at least one period of step (B), the $O_2$ content of the packaging atmosphere reaches a value which is (i) more than 1%, preferably more than 2%, and (ii) less than 7%, preferably less than 5%, particularly less than 3.5%; and
(C) during or after step (B), activating the latent source of exogenous ERA, thereby releasing exogenous ERA which ripens the bananas.

XIX. The use, in packaging bananas, of a container including at least one permeable control member which provides a pathway for $O_2$ and $CO_2$, and which comprises a gas-permeable membrane comprising (1) a microporous film, and (2) a crystalline polymeric coating on the microporous film.

DETAILED DESCRIPTION OF THE INVENTION

In the Summary of the Invention above and in the Detailed Description of the Invention, the Examples, and the claims below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in combination with and/or in the context of other particular aspects and embodiments of the invention, and in the invention generally.

In describing and claiming the invention below, the following abbreviations, definitions, and methods of measurement (in addition to those already given) are used.

OTR is $O_2$ permeability. COTR is $CO_2$ permeability. EtTR is ethylene transmission rate. OTR, COTR and EtTR values are given in ml/m².atm.24 hrs; in some cases, the equivalent in cc/100 inch².atm.24 hrs is given in parentheses. OTR and COTR values referred to herein can be measured using a permeability cell (supplied by Millipore) in which a mixture of $O_2$, $CO_2$ and helium is applied to the sample, using a pressure of 0.7 kg/cm² (10 psi) except where otherwise noted, and the gases passing through the sample were analyzed for $O_2$ and $CO_2$ by a gas chromatograph. The cell could be placed in a water bath to control the temperature. The abbreviation $P_{10}$ is used to mean the ratio of the oxygen permeability at a first temperature $T_1$° C. to the oxygen permeability at a second temperature $T_2$, where $T_2$ is $(T_1-10)$° C. $T_1$ being 10° C. and $T_2$ being 0° C. unless otherwise noted. The abbreviation R or R ratio is used to mean the ratio of $CO_2$ permeability to $O_2$ permeability, both permeabilities being measured at 20° C. unless otherwise noted. Pore sizes given in this specification are measured by mercury porosimetry or an equivalent procedure. Parts and percentages are by weight, except for percentages of gases, which are by volume; temperatures are in degrees Centigrade, and molecular weights are weight average molecular weights expressed in Daltons. For crystalline polymers, the abbreviation $T_o$ is used to mean the onset of melting, the abbreviation $T_p$ is used to mean the crystalline melting point, and the abbreviation ΔH is used to mean the heat of fusion. $T_o$, $T_p$ and ΔH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

The term "comprises" (and grammatical variations thereof) in relation to methods, materials, things etc. (for example packages, containers, and gas-permeable membranes) are used herein to mean that the methods, materials, things etc. can optionally include, in addition to the steps, features, components, etc., explicitly specified after the term "comprises" (and grammatical variations thereof), other steps, features, ingredients, etc. Where reference is made herein to a method comprising two or more steps, the steps can be carried out in any order, or simultaneously, except where the context excludes that possibility. The term "controlled atmosphere" is used herein to mean an atmosphere produced by adding further gases to an existing atmosphere (including the addition of additional quantities of a gas already present in the existing atmosphere), the further gases being added directly to the atmosphere (i.e. not passing through a permeable body before reaching the atmosphere). The term "closed container" is used herein to mean a large container, for example a conventional shipping or trucking container which can be loaded onto a ship or a truck, and which is sealed sufficiently to permit a controlled atmosphere to be maintained therein by conventional means well known to those skilled in the art. The term "shipping or trucking container" is used herein to mean a container which has a volume of at least 8 $m^3$ and which can be loaded onto a ship or a truck. Such containers are well known to those skilled in the art of storing and transporting fruits, vegetables and other respiring materials, and are available in a range of standard sizes. The term "source of exogenous ERA" is used herein to mean a material, object or system which, either immediately or when activated, generates ERA. The term "latent source of exogenous ERA" is used herein to mean a material, object or system which is generating little or no ERA, but which can be activated so that it generates substantial quantities of exogenous ERA. The term "residue of a source of exogenous ERA" is used herein to mean a material, object or system which is not a part of a fruit and which remains after exogenous ERA has been generated from a source of exogenous ERA. The residue may be for example (i) a solid material which served as a support for exogenous ERA itself or for one or more precursors of exogenous ERA, or (ii) a liquid residue remaining after a solution of a precursor for an ERA, e.g. 2-chloroethyl phosphonic acid, has been used to generate exogenous ethylene and/or a solid residue resulting from the evaporation of solvent from such a solution. The term "residue of exogenous ERA" is used herein to denote a chemical compound which results from the reaction of exogenous ERA with the fruit being ripened (in which case it is optionally part of the ripe fruit) or with another substance within the sealed package. The term "ripening" is used herein to mean increasing ripeness; it includes, but is not limited to and generally does not mean, ripening to a point which results in a product which in a retail store would be sold as "ripe". When applied to fruits which ripen through a climacteric, the term "ripening" means ripening the fruits at least through the climacteric. The term "unripe fruits" is used herein to mean fruits which require ripening before they can be sold in retail stores. When applied to fruits which ripen through a climacteric, the term "unripe fruits" means fruits which have not reached their climacteric. The term "banana" is used herein to include plantains.

Where reference is made herein to sealed packages and sealed containers, and to sealing bags and other containers containing biological materials, it is to be understood that the sealing can be, but generally is not, hermetic sealing. Conventional methods for sealing bags and other containers can conveniently be used in this invention. Such conventional methods include, for example, the use of a cable tie to seal the neck of a polymeric bag. A seal made by conventional methods is not a hermetic seal, and has the advantage that it permits equilibration of the pressures inside and outside the bag. If the bag is sealed hermetically, it will generally be desirable to include one or more pinholes in the bag, to achieve such equilibration. The less complete the sealing of the container, the less the influence of the permeability of the container on the packaging atmosphere within it. Thus, even a poor seal may be sufficient, or even desirable, for example when the desired $O_2$ content of the packaging atmosphere lies between the $O_2$ content of the atmosphere surrounding the package and the $O_2$ content of the packaging atmosphere that would result if the seal was a hermetic seal. Under such circumstances, the sealing could be designed to permit a controlled amount of direct exchange between the packaging atmosphere and the atmosphere surrounding the container.

Control Members

The containers used in the present invention preferably, but not necessarily, include at least one atmosphere control member which provides a pathway for $O_2$ and $CO_2$, and which preferably comprises a gas-permeable membrane comprising (1) a microporous polymeric film, and (2) a polymeric coating on the microporous film. The atmosphere control member is preferably a control member as described in one or more of copending, commonly assigned U.S. patent application Ser. Nos. 08/759,602 and 09/121,082 and U.S. Pat. No. 6,013,293 incorporated by reference herein. The atmosphere control member or members generally provide at least 50%, preferably at least 75%, of the $O_2$ permeability of the sealed container.

The microporous polymeric film preferably comprises a network of interconnected pores having an average pore size of less than 0.24 micron, with at least 70% of the pores having a pore size of less than 0.24 micron. Preferably the pores in the microporous film constitute 35 to 80% by volume of the microporous film. Preferred microporous films comprise a polymeric matrix comprising (i) an essentially linear ultrahigh molecular weight polyethylene having an intrinsic viscosity of at least 18 deciliters/g, or (ii) an essentially linear ultrahigh molecular weight polypropylene having an intrinsic viscosity of at least 6 deciliters/g, or (iii) a mixture of (i) and (ii). The microporous film may contain 30 to 90% by weight, based on the weight of the film, of a finely divided particulate substantially insoluble filler which is distributed throughout the film. A preferred process for preparing suitable microporous films comprises
  (A) preparing a uniform mixture comprising the polymeric matrix material in the form of a powder, the filler, and a processing oil;
  (B) extruding the mixture as a continuous sheet;
  (C) forwarding the continuous sheet, without drawing, to a pair of heated calender rolls;
  (D) passing the continuous sheet through the calender rolls to form a sheet of lesser thickness;
  (E) passing the sheet from step (D) to a first extraction zone in which the processing oil is substantially removed by extraction with an organic extraction liquid which is a good solvent for the processing oil, a poor solvent for the polymeric matrix material, and more volatile than the processing oil;
  (F) passing the sheet from step (E) to a second extraction zone in which the organic extraction liquid is substantially removed by steam or water or both; and
  (G) passing the sheet from step (F) through a forced air dryer to remove residual water and organic extraction liquid.

The polymeric coating on the control member preferably comprises a is crystalline polymer having a peak melting temperature $T_p$ of −5 to 40° C., e.g. 0 to 15° C. or 10 to 20° C., an onset of melting temperature $T_o$ such that ($T_p$-$T_o$) is less than 10° C., and a heat of fusion of at least 5 J/g. The polymer preferably comprises a side chain crystalline polymer moiety comprising, and optionally consisting of, units derived from (i) at least one n-alkyl acrylate or methacrylate (or equivalent monomer, for example an amide) in which the n-alkyl group contains at least 12 carbon atoms, for example in amount 35-100%, preferably 50-100%, often 80-100%, and optionally (ii) one or more comonomers selected from acrylic acid, methacrylic acid, and esters of acrylic or methacrylic acid in which the esterifying group contains less than 10 carbon atoms. The preferred number of carbon atoms in the alkyl group of the units derived from (i) depends upon the desired melting point of the polymer. For the packaging of biological materials, it is often preferred to use a polymer having a relatively low melting point, for example a polymer in which the alkyl groups in the units derived from (i) contain 12 and/or 14 carbon atoms. The polymer can be a block copolymer in which one of blocks is a crystalline polymer as defined and the other block(s) is crystalline or amorphous. Preferred block copolymers comprise (i) polysiloxane polymeric blocks, and (ii) crystalline polymeric blocks having a $T_p$ of −5 to 40° C. Such a polymer can be prepared by copolymerizing a mixture of reactants which comprises (i) at least one n-alkyl acrylate or methacrylate in which the n-alkyl group contains at least 12 carbon atoms and (ii) a polysiloxane having a copolymerizable group at one end thereof.

Other polymers which can be used to the coat the microporous film include cis-polybutadiene, poly (4-methylpentene), polydimethyl siloxane, and ethylene-propylene rubber.

The gas-permeable membrane preferably has one or more of the following properties
(i) a $P_{10}$ ratio, over at least one 10° C. range between −5 and 15° C. or between 10 and 20° C. of at least 2.0 to 2.8;
(ii) an OTR at all temperatures between 20° and 25° C. of 2,480,000 to 7,000,000 ml/m².atm.24 hr. (160,000 to 450,000 cc/100 in².atm.24 hr); and
(iii) an R ratio of at least 1.3, preferably 2.0, particularly at least 3.0, especially at least 3.5.

In one embodiment, the control member comprises
(a) the gas-permeable membrane; and
(b) an apertured cover member which lies between the gas-permeable membrane and the air surrounding the package;
the gas permeable membrane having, in the absence of the apertured cover member,
(i) an $O_2$ permeability, $OTR_{perm}$, of at least 155,000 ml/m²·atm·24 hr (10,000 cc/100 in²·atm·24 hr), and
(ii) a permeability ratio, $R_{perm}$, of at least 2, and
the apertured cover member being composed of
(i) a barrier portion having an $O_2$ permeability, $OTR_{bar}$, which is less than 0.5 times, preferably less than 0.01 times, $OTR_{perm}$, and
(ii) an aperture portion which comprises at least one aperture having an area of at least 0.015 in² and through which the gas-permeable membrane is exposed to the air surrounding the package, the aperture portion being such that the control member has a permeability ratio, $R_{control}$, which is at most 0.9, preferably at most 0.8, times $R_{perm}$, and which is preferably greater than 1.00.

The aperture portion of the cover member may have an area $A_{open}$ which is at most 0.04 times $A_{perm}$, where $A_{perm}$ is the area of the gas-permeable membrane. The aperture portion can consist of one or more apertures, each aperture having an area, $A_{aperture}$, less than 0.155 in². For further details of such atmosphere for control members, reference should be made to U.S. Pat. No. 6,013,293.

The $O_2$ permeability of the container at 13° C. per kilogram of fruits therein (OP13/kg) is preferably at least 700, particularly have least 1000, especially at least 1500, ml/.atm.24 hrs. The R ratio of the container at 13° C. is preferably at least 2, particularly at least 3. The ethylene permeability of the container at 13° C. per kilogram of fruits therein (EtP13/kg) is preferably at least 3 times, particularly at least 4 times, the OP13/kg of the container.

The permeability of the container, whether or not it includes an atmosphere control member, can be influenced by perforating the container in order to make a plurality of pinholes therein.

Fruits

This invention is particularly useful for (but is not limited to) the ripening and/or storage of the wide range of fruits which ripen (or undergo other changes, for example, in the case of citrus fruits, de-greening) when exposed to ethylene, for example apples, apricots, avocados, bananas, blueberries, cherimoyas, dates, figs, kiwis, mangos, melons, peaches, papayas, pears, peppers, persimmons, and plums (all of which go through a climacteric when they ripen), as well as cherries, grapes, lemons, oranges, tomatoes and strawberries. Some aspects of the invention are especially useful for fruits which in commercial practice are ripened in ethylene-containing ripening rooms, for example avocados, bananas, Bartlett pears, kiwis, mangos, melons, peppers and tomatoes.

Storage of Unripe Fruits

When the invention is being used to store unripe fruits, it is possible to produce desired packaging atmospheres by the selection of containers which, when sealed around the quantities of fruits in question at the selected storage temperature, have appropriate permeabilities to $O_2$ and $CO_2$, and by the selection of an appropriate controlled atmosphere around the sealed packages. Those skilled in the art will have no difficulty, having regard to their own knowledge and the contents of this specification, in making appropriate selections to produce a desired packaging atmosphere or to make a desired compromise between (i) the cost and inconvenience of obtaining an entirely satisfactory combination of container and controlled atmosphere, and (ii) the disadvantage of storing the fruits in a packaging atmosphere which is in some ways unsatisfactory.

The table below sets out, for some of the fruits for which this invention is useful, ranges for the concentrations of $O_2$ and $CO_2$ which may be used during storage. The invention is, however, useful, for storing these and other fruits outside the ranges stated in the table below.

| Fruit | $O_2$ content | $CO_2$ content |
| --- | --- | --- |
| Banana | 2-5% | 3-7% |
| Tomato | 3-5% | 2-3% |
| Kiwi, nectarine, peach | 1-2% | 3-5% |
| Fig, blackberry, blueberry, raspberry, strawberry | 5-10% | 15-20% |
| Mango, papaya, pineapple | 3-5% | 5-8% |
| Avocado | 2-5% | 3-10% |

Ripening Unripe Fruits by Exposure to Exogenous ERA

In many aspects of the invention, unripe fruits are ripened by exposure to exogenous ERA while the fruits are in a sealed container. In some embodiments, the exogenous ERA enters the packaging atmosphere through the container from the atmosphere surrounding the sealed packages, for example as a result of
  (i) placing the sealed packages in a conventional ripening room containing exogenous ethylene; or
  (ii) generating an exogenous ERA-containing atmosphere around the sealed packages while they are in a closed container, e.g. a shipping or trucking container, for example by injecting ethylene gas into the container, or by the activation of a source of exogenous ERA which is within the container, but not within the sealed packages; such a source of exogenous ERA could be packed into the container with the sealed packages containing the fruits, for example in the form of packages which release the ripening agent after a desired delay.

In other embodiments, the ERA is generated within each package by activating sources of exogenous ERA placed individually in the sealed packages of unripe fruits. It is also possible to use a combination of these embodiments.

The amount of ERA in the packaging atmosphere should be sufficient to assist ripening. Thus the packaging atmosphere in each of the sealed packages should contain at least 2.5 ppm, typically but not necessarily 100 to 3000 ppm, preferably 250 to 1000 ppm, of ERA. When the exogenous ERA is added to or generated in the atmosphere surrounding the sealed packages, the concentration of ERA in the packaging atmosphere will increase gradually as the exogenous ERA passes through the sealed container, at a rate which depends upon the concentration of ERA in the surrounding atmosphere. If, therefore, a rapid initiation of ripening is desired, the concentration of ERA in the atmosphere surrounding the sealed packages is preferably least 500 ppm, particularly at least 1000 ppm. The table below shows the time taken to reach an ethylene concentration of 100 ppm in the packaging atmosphere of a sealed package of bananas according to the invention, when placed in a ripening room containing the indicated concentrations of ethylene.

sealed packages may be above, at, or below ambient temperature. However, it is generally preferred that the atmosphere should be at a temperature less than 22° C., preferably less than 21° C., for example 16-21° C., or even lower, for example at a temperature less 18° C. or less than 16° C., e.g. at 14-15° C.

The atmosphere within the bags will change substantially during the ripening process, as the ripening fruits consume $O_2$ and generate $CO_2$. The packaging atmosphere, for at least part of the period before ripening fruits reach their climacteric, may contain at least 10%, preferably at least 12%, particularly 14 to 19%, of $O_2$, and less than 10%, preferably less than 4%, of $CO_2$, with the total quantity of $O_2$ and $CO_2$ being less than 20%, preferably less than 17%. For at least part of the period after ripening fruits have passed their climacteric, the packaging atmosphere may contain at least 0.8%, for example 1.5 to 6% or 1.5 to 3%, of $O_2$, and less than 15%, preferably less than 7%, of $CO_2$, with the total quantity of $O_2$ and $CO_2$ being less than 16%, preferably less than 10%.

When it is desired to ripen fruits while they are being transported, for example on a ship or a truck, ripening by means of a source of exogenous ERA placed within the sealed packages and/or by means of a source of exogenous ERA placed within a large closed container containing the sealed packages, is particularly useful. The ripening can be preceded by a storage period in which there is little or no ripening. The ripening and optional storage process can be controlled so that the fruits are at a desired state of ripeness when they reach their destination. During the process, there may be no need to alter the atmosphere around the sealed packages. However, when the fruits are stored before they are ripened, it may be desirable to restrict the amount of oxygen which enters the sealed packages during storage, in order to prevent or delay ripening. When the packages can be surrounded by a controlled atmosphere (for example while being transported in the hold of a suitably equipped ship), this result can be achieved by placing the sealed packages in a controlled atmo-

| Ethylene concentration ppm | 100 | 200 | 300 | 400 | 500 | 700 | 1000 | 1500 | 2000 |
|---|---|---|---|---|---|---|---|---|---|
| Time (hrs.) | 5.4 | 1.5 | 0.9 | 0.7 | 0.5 | 0.4 | 0.25 | 0.2 | 0.1 |

An advantage of ripening fruits in a sealed container in accordance with the invention, by comparison with conventional ripening by means of a controlled atmosphere directly in contact with the fruits is that the ripe fruits can be substantially less dehydrated. It is believed that this is because ripening takes place in a more controlled fashion, resulting in lower peak temperatures in the fruits, which in turn results in the reduced dehydration. Thus, bananas typically lose 3 to 5% of their weight between packaging directly after harvest and being put on retail sale. I have found that, through use of the present invention, this weight loss can be substantially reduced, for example to less than 0.5%. Another benefit, when the ripening is carried out below room temperature, is reduced demand on the refrigeration equipment.

The temperature at which ripening is carried out and the concentration of ERA in the packaging atmosphere influence the rate at which ripening takes place. In general, slower ripening results in ripened fruits which remain in a desired range of ripeness for a longer period. On the other hand, rapid ripening may be desired, for example in view of delivery dates required by retail outlets. Thus, the atmosphere around the sphere containing less than the 5 amount of oxygen present in air (about 21%), for example less than about 12%. The source of exogenous ERA can make ERA available immediately after packaging the bananas, or after a desired delay. Delayed release of ERA can result, for example, from the use of an exogenous ERA source which (i) is activated by an increase in moisture content (for example by water which reaches the ERA source as a result of capillary wicking of water through an intermediate body which separates a water reservoir from the ERA source), or (ii) is associated with (e.g. surrounded by or adsorbed onto) a material which releases ERA or one or more precursors for an ERA, after a set time or in response to some outside intervention, for example an increase in temperature.

Any convenient source of exogenous ERA can be used. I have obtained good results using 2-chloroethyl phosphonic acid, which is often referred to herein as 2CPA. 2CPA can be used in the form of an aqueous solution, for example of concentration 3-4%. The rate at which 2CPA generates ethylene increases with increasing pH of the aqueous solution, which can be adjusted, for example to more than 4, particularly more than 7, by the addition of suitable materials, for example buffer solutions and/or sodium bicarbonate solutions. In one embodiment, a 2CPA solution and a pH adjuster are adsorbed on the same or different absorbent pads, e.g. paper pads, and the pad(s) placed in the bottom of the bag and covered with a polymeric sheet before the unripe fruits are placed in the containers. In another embodiment, a solution of 2CPA is applied to the unripe fruits, for example by dipping or spraying, before they are placed in the bag. The invention also includes the possibility that ripe fruits are the source of exogenous ERA, the ripe fruits generating ethylene and being of the same family as, or a different family from, the unripe fruits which are to be ripened. For example, for ripening green bananas, the source of exogenous ERA could be a perforated container containing apples or bananas which have passed their climacteric.

As in the aspects of the invention which involve ripening in an exogenous ERA-containing atmosphere surrounding the sealed packages, the atmosphere within sealed bags containing a source of exogenous ERA will change during the ripening process. The packaging atmospheres, for at least part of the periods before and after the climacteric, are preferably as stated above when the sealed bags are surrounded by an exogenous ERA-containing atmosphere.

Quantities of Fruits

The invention can in principle be used for any quantity of fruits. In some embodiments, for example when the invention is used for storing and/or ripening green bananas, the sealed container preferably contains at least 4 kg, particularly at least 15 kg, especially 16 to 22 kg of bananas or other fruits. In other embodiments, smaller quantities are used, for example to increase the shelf life of bananas at a desired color stage.

EXAMPLES

The invention is illustrated in the following Examples, a number of which are comparative Examples, designated by the letter C before the number of the example. The bananas, bags and control members used in the Examples were as follows.

Bananas

The bananas were Cavendish bananas, from Ecuador in Examples 1A-B, C11-12, 2, C2, 4A-B and C41-42, from Costa Rica in Examples 5 A-C and C5, and from Colombia in the other Examples.

Bags

The large bags were about 0.96 m (38 in.) wide and about 1.2 m (50 in.) long, and were made from polyethylene film about 0.056 mm (2.2 mil) thick (available from Roplast Industries under the tradename RA 3030). The polyethylene film had an OTR at 13° C. of about 2915 (188) and at 22° C. of about 4,650 (300), and EtTR at 13° C. of about 11,400 (735) and at 22° C. of about 18,100 (1,170), an R ratio of about 4.5, and a P10 ratio (between 0 and 10° C.) of about 1.76. The small bags were about 0.3 m (12 in.) wide and about 0.46 m (18 in.) long, and were made from the same polyethylene film.

Control Members

The Type S control members were as described in copending commonly assigned U.S. application Ser. No. 09/121,082 and corresponding International Publication No. WO 00/04787 and comprised a microporous polyethylene film coated with a polysiloxane/SCC block copolymer. The Type S members had an OTR at 13° C. of about 3,803,850 (245, 410) and at 22° C. of about 5,000,000 (324,000), an EtTR at 13° C. of about 16,280,000 (1,050,300) and at 22° C. of about 19,500,000 (1,260,000), an R ratio of about 3.8, and a P10 ratio (between 0 and 10° C.) of about 1.8. The microporous polyethylene film contained 50-60% silica, had a thickness of about 0.18 mm (0.007 inch), a tear strength of about 90g, a porosity of about 65%, an average pore size of about 0.1 micron and a largest pore size of 4-10 microns (available from PPG industries under the tradename Teslin SP 7). The block copolymer was prepared by the reaction of a polydimethyl siloxane terminated one end only by a methacryloxypropyl group (available from Gelest under the tradename MCR Ml 7), 40 parts, dodecyl acrylate, 26.8 parts and tetradecyl acrylate, 33.2 parts, as described in Example A7 of U.S. application Ser. No. 09/121,082 and corresponding International Publication No. WO 00/04787.

The Type A control members were as described in copending commonly assigned U.S. application Ser. No. 08/759,602 and corresponding International Publication No. WO 96/38495, and comprised the same microporous polyethylene film coated with an SCC polymer of dodecyl acrylate, 42 parts, tetradecyl acrylate, 53 parts, and acrylic acid, 5 parts. The Type A members had an OTR at 22° C. of about 1,705,000 (110,000), an R ratio of about 4, and a P10 ratio (between 0 and 10° C.) of about 1.4.

In each Example, the control member was secured to a portion of the bag in which one or more round holes had been cut. The effective area of the control member is about equal to the area of the hole or holes in the portion of the bag to which the control member is attached. However, in Examples 1A-B, C11-12, 2, C2, 3A-D and C31-33, the periphery of the control member was heat sealed to the interior of the bag, thus creating a control member of the kind described in U.S. Pat. No. 6,013,293. In the other Examples, the control member was secured to the exterior of the bag by means of a layer of a pressure sensitive adhesive on the peripheral margin of the control member.

The color stages referred to in the Examples are those accepted by the industry and as shown below.

| Color stage | Description |
| --- | --- |
| 1 | 95% green |
| 2 | 80% green, 20% slightly yellow |
| 3 | 50% yellow, 50% green |
| 4 | 80% yellow, 20% light green |
| 5 | 95% yellow, with slight green color at stem and blossom end |
| 6 | 100% yellow |
| 7 | 100% yellow with brown sugar spots |

Bananas are preferably at color stage 3.5 to 5 when put on retail sale.

Many of the Examples are summarized in Tables 1-8 below. In the Tables, when more than one result is given for a particular Example, this reflects the fact that more than one test was carried out under the same conditions.

Examples 1A-B, C11-12, 2 and C2

Each of these Examples uses a large bag. In Examples C11, 1A-B and 2, each bag has one S-type control member placed under two or more holes in the bag. In Example C11, the control member had an area of 1935 mm$^2$ (3 in$^2$) and was placed under two holes, each of diameter 20.6 mm (0.81 in.). In Example 1A, the control member had an area of 6450 mm$^2$ (10 in$^2$) and was placed under 6 holes, each of diameter 20.6 mm (0.81 in.). In Examples 1B and 2, the control member had an area of 12,900 mm$^2$ (20 in$^2$) and was placed under 6 holes, each of diameter 28.7 mm (1.13 in). Each bag was packed with about 20 kg (44 lb) of green bananas. The bananas had been harvested at week 11 and maintained at 13-14° C. for about 11 days after harvest before being packed. Except in Examples C12 and C2, excess air was extracted from the bags using a vacuum pump, and the bags were then sealed using tie wraps. In Examples C12 and C2, the bags were left open. The bags were maintained at 13° C. for an extended time, Examples 1A, 1B, C11 and C12 being terminated at day 62, and Examples 2 and C2 being terminated at day 40. The results are given in Table 1 below. In Example 2, traces of ethylene (generated by the ripening of the bananas) remained in the test chamber from Example 1 and caused the bananas to ripen more rapidly than in the otherwise substantially identical Example 1B. This demonstrates the desirability of excluding ethylene when long storage periods are needed (and conversely, the ability to accelerate ripening when desired).

area of 3225 mm$^2$ (5 in$^2$) and was placed under 4 holes, each of diameter 19 mm (0.75 in.). In Example 3, the control member had an area of 12,900 mm$^2$ (20 in$^2$) and was placed under 6 holes, each of diameter 25 mm (1 in.). In Example C34, the bag did not have a control member. Each bag was packed with about 18.1 kg (40 lb) of green bananas. The bananas had been harvested at week 13, and maintained at 13-14° C. for about 11 days after harvest before being packed. Except in Example C34, excess air was extracted from the bags using a vacuum pump, and then securely tied (the bags were not, however, as completely sealed as in Examples 1 and 2). In Example C34, the bags were left open. The sealed bags were cooled to about 13° C. and shipped to Gulfport, Mississippi, and then to San Francisco, Calif., maintaining the temperature at about 13° C. In San Francisco, 36 days after packing, half the bags in each Example were opened, and the other half left intact. All the bags were then exposed to exogenous ethylene (500-1000 ppm) in a commercial ripening room for about 24 hours. The bananas in the opened bags

TABLE 1

| | Example No. | | | | | |
|---|---|---|---|---|---|---|
| | C11 | 1A | 1B | C12 | 2 | C 2 |
| Control member | yes | yes | yes | no | yes | no |
| Total area of holes in bag under control members (mm$^2$) | 670 | 2000 | 3880 | — | 3880 | — |
| Color stages | | | | | | |
| first change at day | >62 | 44 | 44 | 12 | 26 | 15 |
| days to change from 3.5 to 4.5 | — | — | — | — | 4.5 | * |
| days to change from 3.5 to 5 | — | ** | 11 | 7 | # | * |
| Weight loss (%) | | | | | | |
| on day 26 | — | — | — | — | 0.35 | 3.7 |
| on day 41 | 0.38 | 0.45 | 0.60 | 4.73 | — | — |
| Taste and texture | | | | | | |
| on day 40 | — | — | — | — | Exct | ♦ |
| on day 62 | UGH | Exct | Exct | Overripe | — | — |
| % O$_2$ (approximate) | | | | | | |
| at day 7 | 5.1 | 11.9 | 13.8 | atm | — | atm |
| at day 8 | — | — | — | atm | 14.35 | atm |
| at day 47 (after climacteric) | 5.0 | 0.96 | 2.2 | atm | 2.15 | atm |
| % CO$_2$ (approximate) | | | | | | |
| at day 7 | 5.3 | 3.6 | 3.05 | atm | — | atm |
| at day 8 | — | — | — | atm | 3.05 | atm |
| at day 29 (after climacteric) | — | — | — | atm | 8.0 | atm |
| at day 47 (after climacteric | 5.3 | 7.9 | 8.4 | atm | — | |

UGH unripe, green and hard.
* the bananas had a color of 4.5 when the test was terminated at day 62
Exct excellent taste and texture
test terminated at this point; extrapolation indicates that time to change from color 3.5 to 5 would be 5.9 days.
♦ Bananas removed on day 26 because they were over-ripe.

Examples 3 and C31-33

Each of these Examples uses a large bag. In Examples C31-33 and 3, each bag has one S-type control member placed under one or more holes in the bag. In Example C31, the control member had an area of 967 mm$^2$ (1.5 in$^2$) and was placed under a single hole of diameter 20.6 mm (0.81 in.). In Example C32, the control member had an area of 1935 mm$^2$ (3in$^2$) and was placed under 2 holes, each of diameter 20.6 mm (0.81 in.). In Example C33, the control member had an ripened rapidly in the expected way; thus by day 43, their color was 6, by day 46 their color was greater than 7, and by day 49, they were overripe. The bags which were still sealed were opened on day 49. The results for the bags opened on day 49 are shown in Table 2 below. These Examples demonstrate that bananas harvested at 13 weeks can be transported in a suitably designed bag, and can be ripened into an excellent product by exposure to exogenous ethylene, either through the bag or after opening the bag.

TABLE 2

| | Example No. | | | | |
|---|---|---|---|---|---|
| | C31 | C32 | C33 | 3 | C 34 |
| Control member | yes | yes | yes | yes | no |
| Total area of hole(s) in bag under control member (mm$^2$) | 335 | 670 | 1140 | 3040 | — |
| Days to change from color stage 3.5 to color stage 5 | >8 | >8 | >8 | 5.5 | DDU |
| Taste and texture on day 49 | SGU | SGU | SGU | Exct | DDU |
| % O$_2$ (approximate) | | | | | |
| at day 23 | 8.6 | 9.8 | 12.7 | 15.5 | |
| at day 46 | 2.9 | 0.6 | 1.8 | 2.2 | |
| % CO$_2$ (approximate) | | | | | |
| at day 23 | 4.45 | 3.65 | 3.3 | 2.85 | |
| at day 46 | 13.8 | 11.4 | 5.0 | 9.0 | |

SGU soft, green and unpalatable
DDU dehydrated, decayed and unpalatable by day 47 (day 11 after exposure to ethylene)
Exct excellent taste and texture Examples 4A, 4B, C41 and C42

Each of these Examples uses a small bag. In Examples 4A-B, each bag has one A-type control member placed over four or five holes in the bag. In Example 4A, the control member had an area of 145 mm$^2$ (5.7 in$^2$) and was placed over four holes each of diameter 19 mm (0.75 in.). In Example 4B, the control member had an area of 4516 mm$^2$ (7 in$^2$) and was placed over 5 holes, each of diameter 19 mm (0.75 in.). In Example C41, the control member and the holes under it were as in Example 4A, except that the control member was an uncoated microporous film. In Example C42, the bag was intact except for 200 pinholes each about 0.5 mm (26 gauge) in diameter. Each bag was packed with about 1.35 kg (3 lb) of green bananas which had been maintained at 13-14° C. for about 11 days after harvest. Except in Example C42, excess air was extracted from the bags using a vacuum pump, and the bags were then securely tied. In Example C42, the bags were left open. After three days, to allow the packaging atmosphere to equilibrate, the bags were exposed to exogenous ethylene (500-1000 ppm) in a ripening room. The results are shown in Table 3 below. These Examples demonstrate that small quantities of bananas can be ripened in a suitably designed bag, and can remain in the bag in excellent condition for several days longer than bananas exposed to the air.

TABLE 3

| | Example No. | | | |
|---|---|---|---|---|
| | 4A | 4B | C41 | C42 |
| Control member | yes | yes | ♦ | no |
| Total area of holes in bag over control member (mm$^2$) | 1140 | 1425 | 1140 | — |
| Color stage on day 10 after ethylene treatment | 4.0 | 4.4 | 7.0 | 6.8 |
| Weight loss (%) on day 10 after ethylene treatment | 0.57 | 0.72 | 1.05 | 0.61 |
| Taste & texture on day 10 after ethylene treatment | Exct | Exct | Over-ripe | Over-ripe |

♦ uncoated microporous film
Exct excellent taste and texture

Examples 5A, 5B, 5C and C5

These Examples show that the bananas generate heat more evenly when ripened in a container including an atmosphere control member. In each Example, a large bag was packed with about 18.1 kg (40 lb.) of green bananas. The green bananas had been harvested 13 days previously and had been stored at 13-14° C. since harvest. A temperature sensor (available from Sensitech, Beverly, Mass., under the tradename Temptale P) was inserted into one banana in each bag. In each of Examples 5A, 5B and 5C, the bag had two S-type control members, each having an area of 11,300 mm$^2$ (17.5 in$^2$). Each control member was placed over a single hole in the bag, the hole having an diameter of 70 mm (2.75 in.) in Example 5A, 74.4 mm (2.93 in.) in Example 5B, and 78.7 mm (3.1 in.) in Example 5C. In Example C5, the bag was perforated so that the bananas were surrounded by air. The bags were then sealed with rubber bands. The sealed bags were placed in a refrigerated room at about 13° C. After about 84 hours, the temperature of the room was raised to about 16.7° C. and after about 12 hours, an ethylene generator was used to provide an initial ethylene concentration in the room of 500-1000 ppm. About 24 hours after the generation of ethylene had begun, the room was vented. The temperature of the bananas was monitored for about 15 days, and reached a peak at about 60 hours after the generation of ethylene had begun. At that time, the concentration of O$_2$ and CO$_2$ was measured. The results are shown in Table 4 below. It will be seen that the peak temperature was substantially lower in the bags containing control members than in the perforated bag.

TABLE 4

| | Example No. | | | |
|---|---|---|---|---|
| | 5A | 5B | 5C | C5 |
| Control member | yes | yes | yes | no |
| Total area of holes in bag under control members (mm$^2$) | 7700 | 8700 | 9700 | — |

TABLE 4-continued

|  | Example No. | | | |
| --- | --- | --- | --- | --- |
|  | 5A | 5B | 5C | C5 |
| Temperature (° C.) of bananas 12 hrs after temperature of room was set to 16.7° C. | 16.3 | 15.9 | 15.7 | 16.6 |
| Peak Temperature ° C. | 21.2 | 21.1 | 20.9 | 23.9 |
| Difference between peak temperature and 16.6° C. | 4.9 | 5.3 | 5.2 | 7.3 |
| % $O_2$ 60 hours after injection of ethylene | 2.2 | 1.75 | 1.9 | 20.95 |
| % $CO_2$ 60 hours after injection of ethylene | 7.95 | 6.1 | 7.4 | 0.03 |

Examples 6 A-E

Each of these Examples uses a large bag having two S-type control members, each control member having an area of 11,300 mm² (17.5 in²). Each control member was placed over seven holes in the bag, each hole of diameter 25.4 mm (1 in). A paper pad about 300×400 mm (12×16 in.) impregnated with an aqueous solution of 2CPA (3.9%) was placed in the bottom of each bag and covered with a sheet of polyethylene. The amount of the solution varied from Example to Example, and is shown in Table 5 below. About 18.1 kg (40 lb.) of green bananas were then placed in each bag, and the bags were sealed with rubber bands. The green bananas had been maintained at 13-14° C. for about 11 days after harvest. The sealed bags were left in a cold room at 13-14° C. The color stage of the bananas was monitored, and Table 5 below shows the time in days taken to reach color stages 4 and 5.5.

TABLE 5

|  | Example No. | | | | |
| --- | --- | --- | --- | --- | --- |
|  | 6 A | 6B | 6C | 6D | 6E |
| Control member | yes | yes | yes | yes | yes |
| Total area of holes in bag under control members (mm²) | 7100 | 7100 | 7100 | 7100 | 7100 |
| mL of 3.9% 2CPA solution on paper pad | 30 | 50 | 100 | 200 | 500 |
| Days to color stage 4 | 11 | 10.8 | 10.6 | 11 | 9.6 |
|  | * | 20.4 | 20.1 | 12 | 12 |
|  | * | 10.5 | 11 | 11 | 11 |
| Days to color stage 5.5 | 17.5 | * | 17.4 | 16 | 16.1 |
|  | * | * | 24.2 | 16 | 16.9 |
|  | * | 17.5 | 17.4 | 16 | 16.3 |
| Days from color stage 4 to color stage 5.5 | 6.5 | — | 6.8 | 5 | 6.5 |
|  | — | — | 3.1 | 4 | 4.9 |
|  | — | 7 | 6.4 | 5 | 5.3 |

* this color stage had not been reached when the experiment was terminated after 27 days.

Examples 7 A-D and C71-74

The procedure of Example 6 was followed except for the changes noted below.

1. In Examples 7A-D, there was a single hole, diameter 82.5 mm (3.25 in.), under each of the two control members. The total area of the holes was 10,700 mm².
2. In Examples 7A, 7B and 7C and in comparative Examples C72 and C73, a paper pad impregnated with 0.1 N $NaHCO_3$ solution was placed adjacent to the paper pad impregnated with 2CPA solution, thus increasing the pH of the 2CPA solution and increasing the rate at which ethylene was generated. The amount of the $NaHCO_3$ solution varied from Example to Example as shown in Table 6 below.
3. In Examples 7D and C74, 2CPA was not used, but three days after packing, the bags were exposed to ethylene for 24 hours in a conventional ripening room at 16.7° C. and containing 500-1000 ppm of ethylene.
4. Comparative Examples C71-74 were carried out in which no ethylene was used (C71), or the bag was sealed but did not have a control member (C 72-73), or the bag was not sealed (C74).
5. The ethylene concentration in the bags was measured at various times after packing.

The results obtained are shown in Table 6 below.

TABLE 6

| Example No. | 7A | 7B | 7C | 7D | C71 | C72 | C73 | C74 |
|---|---|---|---|---|---|---|---|---|
| Control member | yes | yes | yes | yes | yes | no | no | no |
| mL 3.9% 2CPA solution | 30 | 30 | 30 | no | no | 30 | 30 | no |
| mL 0.1 N NaHCO$_3$ | 15 | 30 | 60 | no | no | 13 | 30 | no |
| Exposed to ethylene in ripening room | no | no | no | yes | no | no | no | yes |
| Days to color stage 4 | 12 | 10.2 | 6.2 | 6.5 | | | | 4.2 |
| | 12.5 | 10.2 | 9.4 | 6.5 | | | | 4.5 |
| | 15 | 8.4 | 9.8 | 7.1 | | | | 4.5 |
| Days to color stage 5.5 | * | * | 9.5 | 11.5 | | | | 6.6 |
| | * | * | 12.5 | 12 | | | | 7 |
| | * | * | 12.9 | 12.3 | | | | 7.2 |
| Days from color stage 4 to color stage 5.5 | — | — | 3.3 | 5 | | | | 2.4 |
| | — | — | 3.1 | 5.5 | | | | 2.5 |
| | — | — | 3.1 | 5.2 | | | | 2.7 |
| Color after 15 days | | | | | 2 | 2 | 2 | |
| ppm ethylene after | | | | | | | | |
| 0 hrs | 0.47 | 4.11 | 8.65 | | | 5.72 | 10.7 | |
| 7 hrs | 0.58 | 2.36 | 10.0 | | | 7.81 | 13.3 | |
| 72 hrs | 0.68 | 1.94 | 4 | | | 10.8 | 5 | |
| 79 hrs | — | 3.28 | 6.66 | | | 5 | 20.5 | |
| | | | | 4.7 | | 9.43 | 1 | |
| | | | | | | | 16.65 | |
| % O$_2$ after 15 days | 3.73 | 3.97 | 3.72 | | | 0.21 | 0.34 | |
| % CO$_2$ after 15 days | 6.23 | 6.2 | 4.67 | | | 27.3 | 25.5 | |

\* this color stage had not been reached when the experiment was terminated.

Examples 8A-J and C81-83

Examples 8A-J and C 81-83 followed the same procedure as Examples 7A-C and C71-74 except for the changes noted below.
1. The ethylene, O$_2$ and CO$_2$ concentrations were determined at different times.
2. In some of the examples, the second paper pad was impregnated with 30 mL of an aqueous buffer solution (i) containing potassium phthalate and having a pH of 4, (ii) containing dibasic sodium phosphate, monobasic potassium phosphate, sodium chromate and potassium dichromate, and having a pH of 7, or (iii) containing sodium carbonate and sodium bicarbonate and having a pH of 10. These buffer solutions are available from Orion Research Inc.,Beverley, Mass. USA
3. In Examples 8H and C83, the bag was taken to the ripening room 3 days after packing.
4. In Example 8G, the sealed bags were left in a room at about 21° C. (in the other Examples, the room was at 13-14° C.).
5. In Example C83, the bag was not sealed.

The results are shown in Table 7 below.

TABLE 7

| | 8A | 8B | 8C | 8D | 8E | 8F | 8G | 8H | C81 | C82 | C83 |
|---|---|---|---|---|---|---|---|---|---|---|---|
| Control member | yes | yes | yes | yes | yes | yes | yes | yes | yes | no | no |
| mL 3.9% 2 CPA solution | 30 | 30 | 30 | 30 | 30 | 30 | 30 | no | no | 30 | no |
| mL 0.1 N NaHCO$_3$ | no | no | no | 45 | 60 | 75 | 60 | no | no | 60 | no |
| 30 mL of buffer having | pH 4 | pH 7 | pH 10 | no | no | no | no | no | no | no | no |
| Exposed to ethylene in ripening room | no | no | no | no | no | no | no | yes | no | no | yes |
| Days to color stage 4 | 11.9 | 15.4 | 13.1 | 9.4 | 8.5 | 9.0 | 8.2 | 7.7 | * | * | 3.7 |
| | 13.0 | 11.3 | 11.5 | 9.0 | 9.3 | 8.1 | 7.6 | — | — | — | 3.9 |
| | 14.3 | 10.1 | 10.8 | 10.1 | 8.0 | 8.1 | 6.7 | 10.6 | — | — | 3.9 |
| Days to color stage 5.5 | — | — | — | 15.7 | 13.8 | 12.4 | 14.8 | 14 | * | * | 5 |
| | — | 15.3 | — | 12.3 | 13.1 | 11.4 | 12.2 | * | — | — | 6 |
| | — | — | 16.6 | 15 | 11.9 | 11.4 | 9.0 | — | — | — | 6 |
| Days from color stage 4 to color stage 5.5 | * | * | — | 6.3 | 5.3 | 3.4 | 6.2 | 6.3 | — | — | 1.3 |
| | * | 4 | — | 3.3 | 3.8 | 3.3 | 4.6 | — | — | — | 2.1 |
| | * | * | 5.8 | 4.9 | 3.9 | 3.3 | 2.3 | — | — | — | 2.1 |

TABLE 7-continued

|  | 8A | 8B | 8C | 8D | 8E | 8F | 8G | 8H | C81 | C82 | C83 |
|---|---|---|---|---|---|---|---|---|---|---|---|
| ppm ethylene after 24 hrs | 0.88 | 1.67 | 1.37 | 3.25 | 4.39 | 5.58 | 10.99 | 0.49 | 0.39 | 39.5 | 0 |
| % $O_2$ after 8 days | 3.72 | 5.58 | 2.93 | 3.2 | 2.39 | 2.52 | 1.95 | 2.97 | 17 | 0.3 | — |
| % $CO_2$ after 8 days | 4.73 | 4.7 | 5.3 | 4.97 | 5.13 | 5.47 | 7.97 | 4.73 | 1 | 17.6 | — |

* this color stage had not been reached when the experiment was terminated after 17 days.

Examples 9A-C and C91-92

The procedure of Example 6 was followed, except for the changes noted below.

1. There was a single hole, diameter 82.5 mm (3.25 in.), under each control member. The total area of the hole was 5350 mm².
2. No 2CPA-impregnated paper pad was placed in the bag.
3. The bananas, before being packed into the bag, were dipped into a dilute aqueous solution of 2CPA. The concentration of the 2CPA varied from Example to Example as shown in Table 8 below.
4. Comparative Examples C91 and C92 were carried out in which the bag did not have a control member (C91) or the bananas were not treated with 2CPA solution (C92). Comparative Example C91 is the same as the comparative Example C71.

The results obtained are shown in Table 8 below.

TABLE 8

|  | Example No. | | | |
|---|---|---|---|---|
|  | 9A | 9B | C91 | C92 |
| Control member | yes | yes | no | yes |
| Concentration of 2CPA (ppm) | 1116 | 128 | 1116 | 0 |
| Days to color stage 4 | 11.9 | 14.6 | * | * |
|  | 10 | * | * | * |
|  | 11.9 | 11 | * | * |
| Days to color stage 5.5 | * | * | * | * |
|  | * | * | * | * |
|  | * | * | * | * |

*this color stage had not been reached when the experiment was terminated after 27 days.

Table 9 below shows, for each of the bags in Examples 5A-C, 6A-E and 7A-E, the permeability of the bag to $O_2$ and to ethylene ("Et" in Table 9), and the respective contributions of the control member and the remainder of the bag. For this calculation, the size of the bag, after sealing, was assumed to be 0.96×1.04 m (38 in.×41 in.), i.e. to have a total area of 2 m² (3115 in²).

TABLE 9

| Example No. | Perm. of bag (mL/atm.24 hr) at 13° C. | Perm. of bag at 13° C. /kg of bananas | Hole area (m²) | Perm. of ACM at 13° C. | Perm. of rest of bag at 13° C. |
|---|---|---|---|---|---|
| C11 | $O_2$ 8,450 | $O_2$ 470 | 0.000670 | $O_2$ 2,550 | $O_2$ 5,900 |
|  | Et 36,000 | Et 2,000 |  | Et 10,900 | Et 25,100 |
| 1A | $O_2$ 13,500 | $O_2$ 745 | 0.002000 | $O_2$ 7,600 | $O_2$ 5,900 |
|  | Et 57,650 | Et 3,185 |  | Et 32,550 | Et 25,100 |
| 1B | $O_2$ 20,650 | $O_2$ 1,140 | 0.003880 | $O_2$ 14,750 | $O_2$ 5,900 |
|  | Et 88,250 | Et 4,875 |  | Et 63,130 | Et 25,100 |
| 2 | $O_2$ 20,650 | $O_2$ 1,140 | 0.003880 | $O_2$ 14,750 | $O_2$ 5,900 |
|  | Et 88,250 | Et 4,875 |  | Et 63,130 | Et 25,100 |
| C31 | $O_2$ 7,200 | $O_2$ 395 | 0.000335 | $O_2$ 1,300 | $O_2$ 5,900 |
|  | Et 30,650 | Et 1,695 |  | Et 5,500 | Et 25,100 |
| C32 | $O_2$ 8,500 | $O_2$ 470 | 0.000670 | $O_2$ 2,550 | $O_2$ 5,900 |
|  | Et 36,000 | Et 2,000 |  | Et 10,900 | Et 25,100 |
| C33 | $O_2$ 10,250 | $O_2$ 565 | 0.001140 | $O_2$ 4,350 | $O_2$ 5,900 |
|  | Et 43,650 | Et 2,400 |  | Et 18,550 | Et 25,100 |
| 3 | $O_2$ 17,450 | $O_2$ 965 | 0.003040 | $O_2$ 11,550 | $O_2$ 5,900 |
|  | Et 74,600 | Et 4,120 |  | Et 49,500 | Et 25,100 |
| 5A | $O_2$ 35,000 | $O_2$ 1,935 | 0.007700 | $O_2$ 29,100 | $O_2$ 5,900 |
|  | Et 149,800 | Et 8,280 |  | Et 124,700 | Et 25,100 |
| 5B | $O_2$ 39,000 | $O_2$ 2,155 | 0.008700 | $O_2$ 33,100 | $O_2$ 5,900 |
|  | Et 166,650 | Et 9,200 |  | Et 141,550 | Et 25,100 |
| 5C | $O_2$ 42,900 | $O_2$ 2,370 | 0.009700 | $O_2$ 37,000 | $O_2$ 5,900 |
|  | Et 183,550 | Et 10,150 |  | Et 158,450 | Et 25,100 |
| 6 A-E | $O_2$ 32,840 | $O_2$ 1,815 | 0.007100 | $O_2$ 26,940 | $O_2$ 5,900 |
|  | Et 140,500 | Et 7,750 |  | Et 115,400 | Et 25,100 |
| 7 A-E | $O_2$ 46,500 | $O_2$ 2,570 | 0.010700 | $O_2$ 40,600 | $O_2$ 5,900 |
|  | Et 199,200 | Et 11,000 |  | Et 174,100 | Et 25,100 |

Example 10

Three trials were carried out to compare bananas transported and ripened (a) conventionally in 12 conventional bags as controls, and (b) in accordance with the invention in 36 bags having atmosphere control members. Each bag was supported by a cardboard box. The conventional bags were about 1 m. (38.5 in.) by 1.25 m. (49.5 in.) and were made of polyethylene film about 0.18 mm (0.0007 in.) thick. Each conventional bag was perforated with about 312 holes, each about 12.5 mm (0.5 inch) in diameter. The bags used in accordance with the invention were about 1 m. (39.75 in.) by 1.2 m (46.25 in.) and were made of a film of a blend of polyethylene and ethylene/vinyl acetate copolymer about 0.05 mm (0.002 in.) thick. Each bag had two S-type atmosphere control members, each control member being about 145 mm (5.625 in.) by 120 mm (4.72 in.) and being secured to the bag by a layer of adhesive about 11 mm (0.44 in.) wide around its periphery. Under each atmosphere control member, the bag had seven holes each about 25 mm (1 in.) in diameter.

In Columbia, each bag was packed with about 20 kg. of green, freshly harvested bananas. The necks of the bags of the invention were sealed with rubber bands. The necks of the conventional bags were not closed. The bags were weighed and then transported at about 14.5° C. (58° F.) to Watsonville, Calif., U.S.A., where, 13 days after harvest, they were placed in a commercial ripening room containing ethylene for 24 hours at about 16.5° C. (62° F.). The room was then vented and maintained at about 16.5° C. (62° F.) for the next 24 hours, at about 15.5° C. (60° F.) for the next 48 hours, and at about 14.5° C. (58° F.) for the next 24 hours. The bananas were then maintained at about 21° C. (70° F.). The table below shows the average weight loss of the bags, and the color of the bananas in the bags, on the day indicated. The sealed bags were not opened until the day indicated in the table below.

|  | Trial 1 | | Trial 2 | | Trial 3 | |
| --- | --- | --- | --- | --- | --- | --- |
|  | Invention | Control | Invention | Control | Invention | Control |
| Days after harvest | 11 | 9 | 10 | 9 | 10 | 9 |
| Weight loss (%) | 0.44 | 5.17 | 0.4 | 4.6 | 0.07 | 4.66 |
| Color | 5.25 | 7 | 5.75 | 9 | 5.3 | 7 |

The results reported in this table show clearly that the practice of the invention results in bananas which lose less weight through dehydration and which remain at a desired color stage for a longer time.

The invention defined by the claims below is narrower in scope than the invention disclosed in the Summary of Invention, Detailed Description and Examples above. I intend to file one or more continuing applications to claim some or all of the aspects and embodiments of the invention which are disclosed in the Summary of Invention, Detailed Description and Examples above, but not literally claimed by the claims in any patent issued on this application. Therefore, readers of this specification should be aware that I am not dedicating to the public any part of the invention broadly described in this specification, even if it does not fall within the literal scope of the claims in any patent issued on this application.

What is claimed is:

1. A sealed container which
    (A) has a volume of at least 8 m$^3$,
    (B) contains
        (i) a controlled atmosphere in which the content of oxygen is less than in air, and
        (ii) a plurality of sealed packages which are surrounded by the controlled atmosphere, each of the sealed packages comprising
            (a) a sealed polymeric bag, and
            (b) within the sealed polymeric bag, bananas and a packaging atmosphere around the bananas, the packaging atmosphere being an equilibrium atmosphere comprising $O_2$, $CO_2$, and exogenous ethylene or the residue of exogenous ethylene, the $O_2$ content having a substantially constant value which is 1.5 to 6%, the $CO_2$ content having a substantially constant value which is less than 15%, and the total quantity of $O_2$ and $CO_2$ being less than 16%;
        the sealed polymeric bag
            (a) having an $O_2$ permeability at 13° C. per kg of bananas in the package (OP13/kg), of at least 1500 ml/atm. 24 hrs, an ethylene permeability at 13° C. per kg of bananas (EtP13/kg) which is at least 2 times of the OP13/kg, and an R ratio at 13° C. of at least 3; and
            (b) including at least one atmosphere control member which provides a pathway for $O_2$, $CO_2$ and ethylene to enter or leave the packaging atmosphere.

2. A container according to claim 1 wherein the bananas and the packaging atmosphere are the sole contents of each of the sealed bags.

3. A container according to claim 1 wherein the sealed polymeric bag has an EtP13/kg which is at least 3 times the OP13/kg.

4. A container according to claim 1 wherein the bananas have passed the peak of their climacteric.

5. A shipping or trucking container according to claim 1 wherein the packaging atmosphere is at a temperature less than 16° C.

6. A container according to claim 1 wherein each of the sealed packages contain 16-22 kg of the bananas.

7. A container according to claim 1 wherein the packaging atmosphere is at a temperature less than 18° C.

8. A container according to claim 1 wherein the controlled atmosphere surrounding the sealed packages contains less than about 12% of oxygen.

9. A container according to claim 1 wherein the atmosphere control member in each of sealed polymeric bags (i) comprises a microporous polymeric film and a polymeric coating on the microporous film and (ii) provides at least 75% of the permeability of the sealed bag.

10. A container according to claim 1 wherein each of the polymeric bags is a polyethylene bag.

11. A container according to claim 1 wherein each of the polymeric bags contain 16-22 kg of the bananas.

* * * * *